United States Patent [19]

Langston et al.

[11] 4,360,877

[45] Nov. 23, 1982

[54] DISTRIBUTED DATA PROCESSING SYSTEM AND METHOD FOR A FLUID DISPENSER

[75] Inventors: Earl M. Langston, Fort Wayne; Charles W. Moore, Hudson; Richard L. Malecki; Roger C. Bruot, both of Fort Wayne, all of Ind.

[73] Assignee: Tokheim Corporation, Fort Wayne, Ind.

[21] Appl. No.: 138,357

[22] Filed: Apr. 8, 1980

[51] Int. Cl.[3] .............................................. G06F 15/56

[52] U.S. Cl. ...................................... 364/465; 364/510

[58] Field of Search .................... 371/70, 69; 364/465, 364/510

[56] References Cited

U.S. PATENT DOCUMENTS

| | | | |
|---|---|---|---|
| 3,427,585 | 2/1969 | Milford | 371/70 |
| 3,624,603 | 11/1971 | Decomyn | 371/70 |
| 3,978,449 | 8/1976 | Sanders et al. | 371/70 |
| 4,019,172 | 4/1977 | Srodes | 371/69 |
| 4,045,771 | 8/1977 | Loreck | 371/70 |
| 4,107,777 | 8/1978 | Pearson et al. | 364/465 |
| 4,156,866 | 5/1979 | Miller | 371/69 |
| 4,216,529 | 8/1980 | Krystek et al. | 364/510 |
| 4,237,537 | 12/1980 | Pitches et al. | 364/465 |
| 4,247,899 | 1/1981 | Schiller et al. | 364/510 |

*Primary Examiner*—Charles E. Atkinson
*Attorney, Agent, or Firm*—David A. Lundy

[57] ABSTRACT

A distributed data processing system and method for intertransmission of information signals between a central processor and one or more remote computer controlled terminals which includes inputting information signals to the processor and remote terminals for generation of information data at the processor and remote terminals respectively, addressing each of the remote terminals by generation of unique address data at the processor, directing a function of an addressed remote terminal by generation of identifiable function data at the processor and informing the processor of the status of the addressed remote terminal by generation of identifiable status data at the terminal in response thereto, developing complementary data in conjunction with the generation of address, function, status and information data, transmitting the address, function and status data with the complementary data thereof between the processor and remote terminals, transferring the information data and complementary data thereof between the processor and the selected remote terminal in response to the function data, verifying the address, function, status and information data with the complementary data thereof. Also provided is a system and method for verifying the reception of valid data from a signal transmitter which includes a generating a data signal, developing a complementary signal at the transmitter corresponding to the data signal, transmitting the data and complementary signals to a signal receiver and comparatively relating the data and complementary signals whereby the data signal is disregarded by the signal receiver if not in correspondence with the complementary signal.

5 Claims, 22 Drawing Figures

DISTRIBUTED DATA PROCESSING SYSTEM AND METHOD FOR A FLUID DISPENSER

BACKGROUND OF THE INVENTION

The present invention relates to distributed data processing systems and in particular to a central processor controlled data system for use with microcomputer controlled fluid dispensers which are continually polled by the processor and information exchanged therebetween over a common serial data link. A unique data/complementary data format insures the reception of valid information.

Insuring the accurate reception of data is of particular importance in many fields of information transmission and has become increasingly critical with high speed computer technology where each bit of information has significance. Therefore it is absolutely necessary that the receiver be furnished means for checking each bit of data received to quarantee its validity. The dispensing of liquid fuels is no exception, where government standards and economy of operation demand virtually error free monitoring and control of the volume and cost of fuel dispensed.

The rapidly escalating prices of petroleum based fuels has seen a concomitant increase in the number of self-service dispensing stations. A need has therefore arisen for increasingly efficient fuel dispensing systems. It has become necessary to provide the customer and service station operator with a dispensing system which can rapidly accomodate fluctuating prices and money or volume dispensing limitations. Further, continuous monitoring and control of dispensing operations must be accomplished with the least supervisory personnel possible to best hold down rising costs and prices.

Heretofore, numerous hardwired electronic dispensing systems have been utilized. To update such systems to a central control has required complete rewiring of service stations at great expense and inconvenience. Moreover, in most cases the central console has been a mere slaved display allowing the station operator to do little more than reset a dispenser and monitor the end result. Alternatively, the central console itself has contained all of the computation circuitry of the system while the dispenser itself merely displays to the customer what the console has computed. In the latter case, the failure of the console will effectively close down all dispensing operations at the station. Still further, the nature of such system precludes the addition thereto of peripheral equipment such as ticket printers, cash registers etc. without extensive circuit redesign.

The recent advances in microprocessor and microcomputer technology have allowed an increase in the flexibility of design of these dispensing systems but, as with all electronic data systems, they remain susceptible to the introduction of spurious signals due to the numerous interconnecting control lines and electrical equipment located in a service station environment such as has been experienced in prior systems.

It is therefore highly desirable to provide an improved data processing system and method.

It is therefore highly desirable to provide a data processing system and method which insures the accurate reception of data between a transmitter and receiver.

It is also highly desirable to provide a data processing system and method which insures the accurate reception of data in a fuel dispensing system.

It is also highly desirable to provide a data processing system and method which has great flexibility in the establishing of various fluctuating, dispensing parameters.

It is also highly desirable to provide a data processing system and method which has a central console control which can supervise and monitor a dispensing operation while nonetheless allowing the dispensers to operate independently of the console in the event of its failure or desired manual dispensing operation.

It is also highly desirable to provide a data processing system and method which allows the addition of various future dispensing microcomputers thereto, without system redesign while ensuing the accurate transmission and reception of data to and from such equipment.

SUMMARY OF THE INVENTION

Broadly, the present invention is a distributed data processing system and method for intertransmission of information signals between a central processor and one or more remote computer controlled terminals which includes means for inputting information signals to the processor and remote terminals for generation of information data at the processor and remote terminals respectively, means for addressing each of the remote terminals by generation of unique address data at the processor, means for directing a function of an addressed remote terminal by generation of identifiable function data at the processor, means actuatable by the directing means for informing the processor of the status of the addressed remote terminal by generation of identifiable status data at the terminal, means for developing complementary data in conjunction with the generation of address, function, status and information data, means for transmitting the address, function and status data with the complementary data thereof between the processor and remote terminals, means actuatable by the directing means for transferring the information data and complementary data thereof between the processor and a selected remote terminal in response to the function data, means for verifying the address, function, status and information data with the complementary data thereof.

Also provided is a system and method for verifying the reception of valid data from a signal transmitter which includes means for generating a data signal, means for developing a complementary signal at the transmitter corresponding to the data signal, means for transmitting the data and complementary signals to a signal receiver and means for comparatively relating the data and complementary signals whereby the data signal is disregarded by the signal receiver if not in correspondence with the complementary signal.

It is therefore an object of the invention to provide an improved data processing system and method.

It is another object of the invention to provide an improved data processing system and method which insures the accurate reception of data between a transmitter and receiver.

It is another object of the invention to provide an improved data processing system and method which insures the accurate reception of data in a fuel dispensing system.

It is another object of the invention to provide an improved data processing system and method which has great flexibility in the establishing of various fluctuating dispensing parameters.

It is further an object of the invention to provide an improved data processing system and method which provides a central console control which can supervise and monitor a dispensing operation while nonetheless allowing the dispensers to operate independently of the console in the event of its failure or desired manual operation.

It is still further an object of the invention to provide an improved data processing system and method which allows the addition of various future dispensing microcomputers thereto, without system redesign while ensuing the accurate transmission and reception of data to and from such equipment.

BRIEF DESCRIPTION OF THE DRAWINGS

The above mentioned and other features and objects of this invention and the manner of attaining them will become more apparent and the invention itself will be best understood by reference to the following description of an embodiment of the invention taken in conjunction with the accompanying drawings, wherein.

DESCRIPTION OF A SPECIFIC EMBODIMENT

Figure 1A:
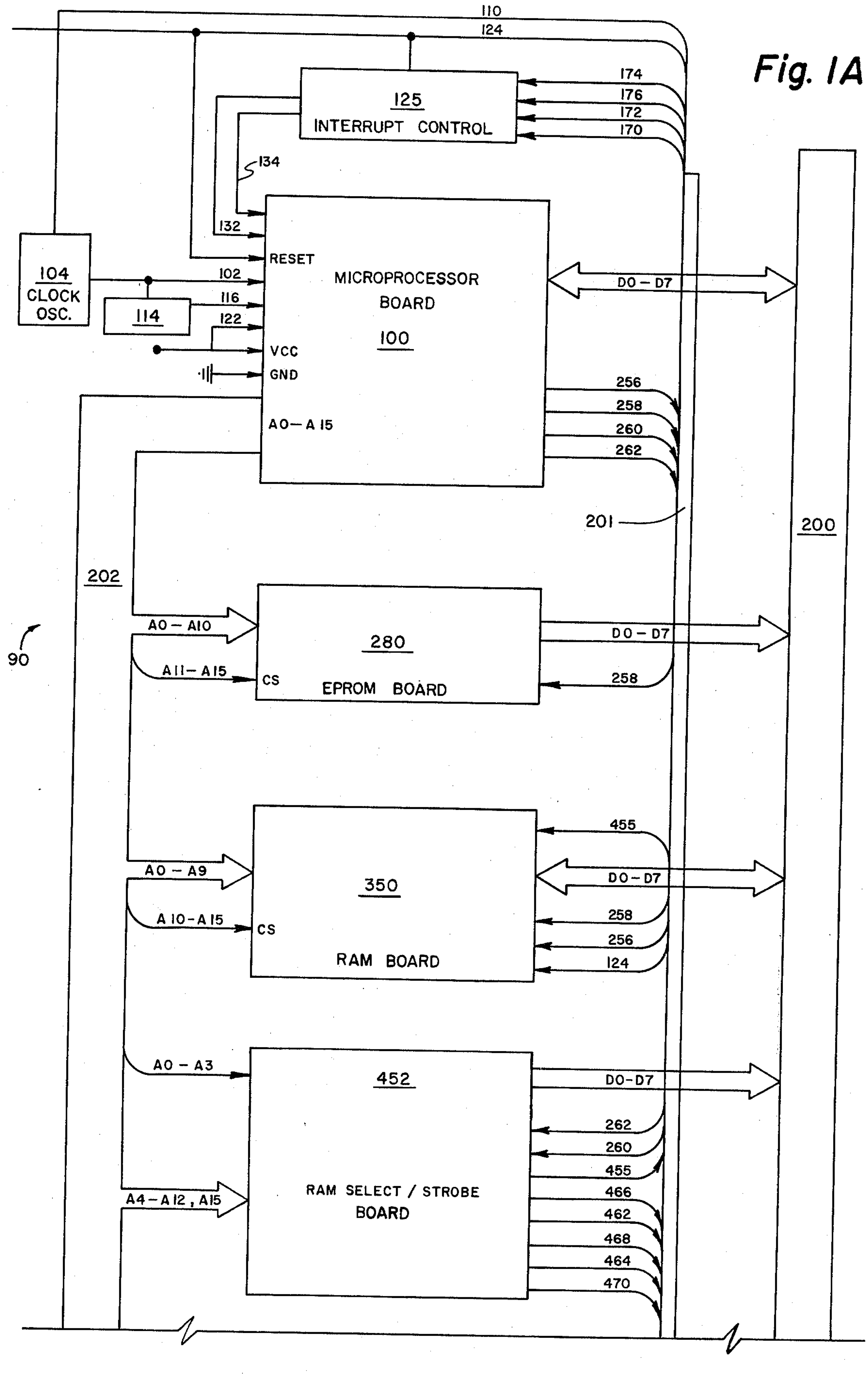
FIGS. 1A, and 1B are a simplified block diagram of the console comprising the central processing unit and associated circuitry in accordance with the present invention.
Figure 1B:
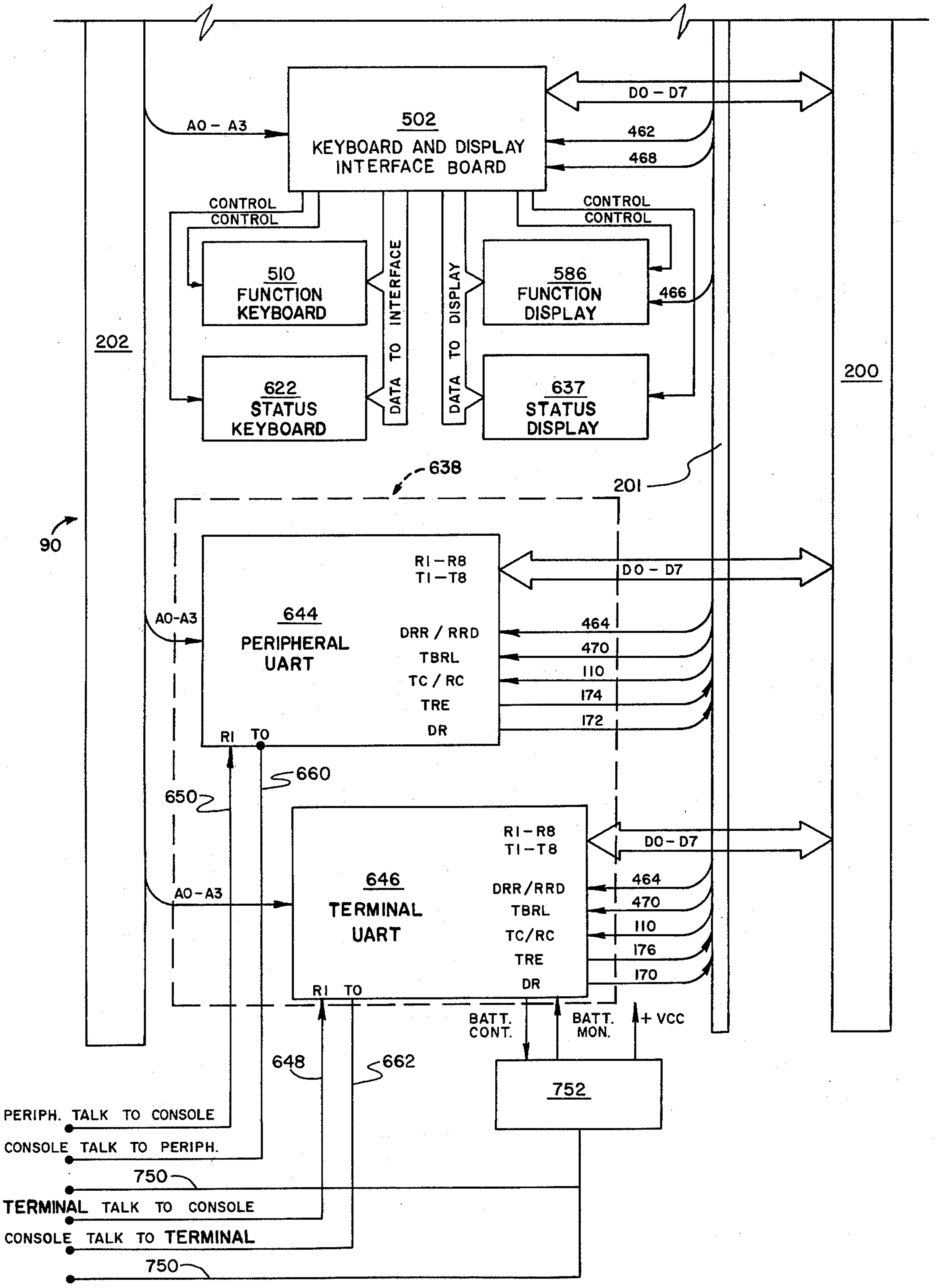

In FIGS. 1A and 1B there is shown a simplified block diagram of a portion of the a CPU-console 90 of the distributed data processing system embodying the invention into a fluid dispensing system. The CPU (central processing unit) 90 includes all the circuitry shown in FIGS. 1A and 1B. To describe it more fully, a microprocessor 100 which in the preferred embodiment is a Z-80, MK3880 manufactured by Zilog, Inc. of Cupertino, California, has sixteen address lines A0–A15 connected to address bus 202 and eight bidirectional data lines D0–D7 connected to data bus 200. Control inputs to and outputs from microprocessor 100 are indicated as lines to control bus 201. There are eight control inputs to microprocessor 100 including a +5 volt power supply terminal and a DC and signal ground terminal. Clock oscillator 104 supplies a clocking signal to the clock signal input of microprocessor 100. Wait state generator 114 causes microprocessor 100 to enter one or more wait states when the latter addresses a memory read signal to a memory source having a slow access time. Active low bus request line 122 is held in a high condition by direct connection to a VCC of +5 volts. Reset to microprocessor 100 is suppied from an external source on line 24. The reset line 124 is also connected to interrupt control circuitry 125 and control bus 201. Non-maskable interrupt line 132 and interrupt line 134 are the output of interrupt control circuitry 125. The interrupt control circuitry has as inputs, among others, dispenser data received ready line 170, peripheral data received ready line 172, peripheral transmit register empty line 174 and dispenser transmit register empty line 176. The control outputs of microprocessor 100 include an active low memory write line 256, memory read line 258, input/output write line 260 and input/output read line 262.

Read only memory for CPU-console 90 is supplied by EPROM (Eraseable Programmable Read Only Memory) board 280 having as a control input memory read line 258. EPROM board 280 is addressed through address lines A0 through A10 of address bus 202 while the chip select function of EPROM board 280 is controlled by address lines All through A15 of address bus 202. Data read from EPROM board 280 is supplied to data bus 200 via data lines D0–D7.

Random access memory storage for CPU-console 90 is provided by RAM board 350 having as control inputs from microprocessor 100 active low memory read line 258 and memory write line 256. Other control inputs to RAM board 350 include the reset line 124 and RAM select line 455. RAM board 350 is addressed through address lines A0 through A9 while the chip select function is controlled by address lines A10 through A15 of address bus 202.

RAM select/strobe board 452 has as control inputs from microprocessor 100, active low input/output write line 260 and input/output read line 262. Control output lines from strobe board 452 include RAM select line 455, I/0R1 line 462, I/0R4 line 464, I/OW0 line 466, I/OW1 line 468, and I/OW4 line 470. Address bus 202 addresses strobe board 452 on address lines A0 through A12 and A15.

Data may be input to CPU-console 90 by means of function key board 510 and status key board 622 controlled by keyboard and display interface 502. Data may be visually displayed on function display 586 or status display 637. Keyboard and display interface 502 is bidirectionally connected to data bus 200. Control inputs to keyboard and display interface 502 include I/OR1 line 462 and I/OW1 line 468 from strobe board 452. Address bus 202 accesses keyboard and display interface 502 through address line A0 through A3.

UART board 638 includes peripheral UART 644 which may be utilized to interface with future dispensing microcomputers, and dispenser UART 646, each of which is accessed by address bus 202 by address lines A0 through A3. Peripheral UART 644 and dispenser UART 646 have as control inputs I/OR4 line 464 and I/OW4 line 470 from strobe board 452. A UART clock line 110 is received from clock oscillator 104. Control outputs to control bus 201 from peripheral UART 644 are peripheral transmit register empty line 174 and peripheral data received ready line 172. Control outputs from dispenser UART 646 are dispenser transmit register empty line 176 and dispenser data received ready line 170. Peripheral UART 644 and dispenser UART 646 access data bus 200 through data lines D0 through D7. UART board 638 is also accessed by power supply/control 752 which allows the monitoring and controlling of the power supply functions. Serial data output from peripheral UART 644 and dispenser UART 646 is effectuated on console talk to peripheral line 660 and console talk to dispenser line 662 respectively. Serial data input is on peripheral talk to console line 650 and dispenser talk to console line 648 respectively.

Figure 2A:
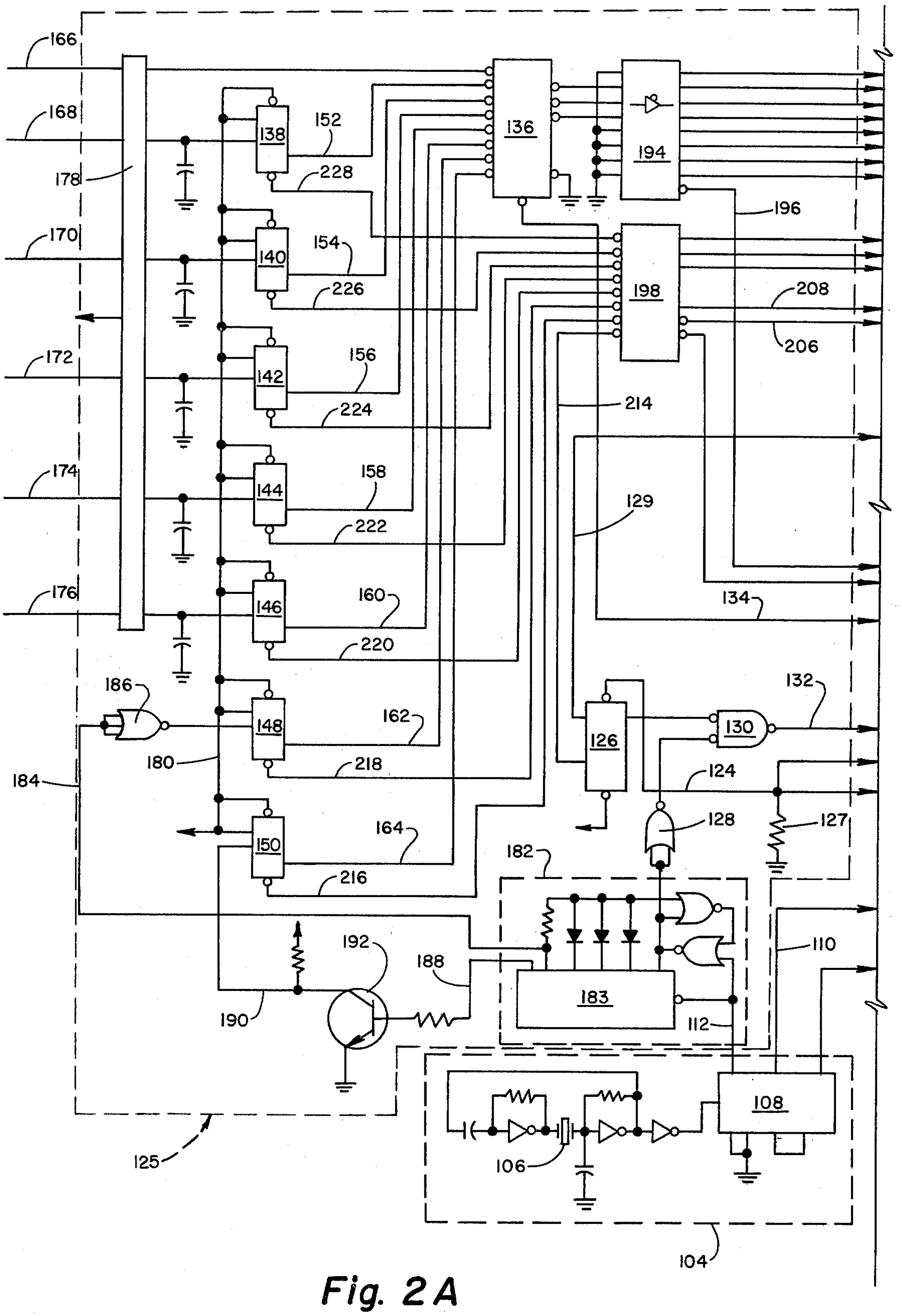
FIGS. 2A and 2B are an electrical schematic of an embodiment of the central processing unit including interrupt control circuitry and a clock oscillator of the present invention.
Figure 2B:
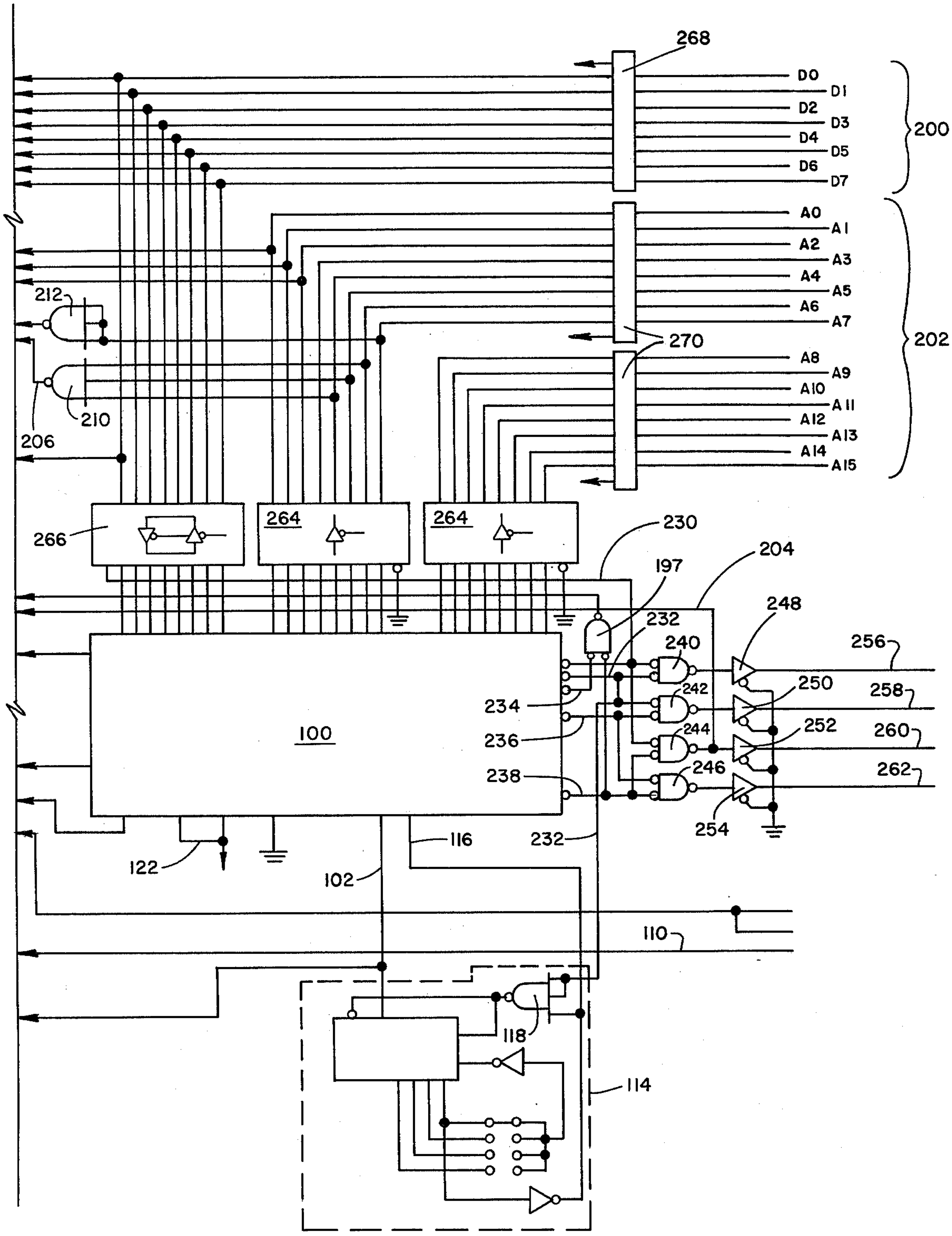

Referring now to the combined FIGS. 2A and 2B, the microprocessor 100 is shown with its associated circuitry and the interrupt control circuitry 125.

In the specific embodiment shown, a five volt signal with a clocking frequency of 2.4576 megahertz is input to CPU 100 on clock input line 102 from clock oscillator 104. The oscillation frequency of clock oscillator 104 is controlled by crystal 106 whose output is reduced in frequency through divider 108. In the embodiment shown, crystal 106 is a 4.9152 megahertz crystal. Dividing its output frequency by a factor of two produces the clock input to microprocessor 100 on line 102. Dividing the output frequency of crystal 106 by a factor of 32 produces a 153.6 kilohertz UART clock signal on UART clock line 110. Another division of the output frequency of crystal 106 is supplied on timer clock line 112 to interrupt timer 182 as will be more fully described below.

Wait state generator 114 is designed to generate a micro cycle delay to allow sufficient access time for slow memory devices. Inputs to wait state generator 114 from clock input line 102 and memory request line ($\overline{MERQ}$) 232, which is input through NAND gate 118, cause the microprocessor 100 to enter one or more wait states until the input on ($\overline{WAIT}$) line 116 goes high.

Bus request ($\overline{BUSRQ}$) line 122 is tied to VCC (inactive state) to enable microprocessor bus control at all times.

Reset ($\overline{RST}$) line 124 is connected to ground through resistor 127 and further connected to the active low set terminal of D-type flip flop 126 of interrupt control circuitry 125, which circuitry supplies the active low interrupt signals on non-maskable interrupt ($\overline{NMI}$) line 132 and interrupt ($\overline{INT}$) line 134.

First priority interrupt line 166 provides an input to priority encoder 136. Similarly, second priority interrupt lines 168 supplies the clock signal to D-type flip flop 138 whose output ($\overline{Q}$) is supplied on interrupt line 152 to priority encoder 136. In like manner, dispenser data received ready (DR2) line 170, peripheral data received ready (DR1) line 172, peripheral transmit register empty (TRE1) line 174 and dispenser transmit register empty (TRE2) line 176 furnish clocking signals to D-type flip flops 140, 142, 144 and 146 respectively. The outputs ($\overline{Q}$) of D-type flip flops 140, 142, 144 and 146 are supplied to priority encoder 136 on interrupt lines 154, 156, 158 and 160. Pull up resistor module 178 pulls up first priority interrupt line 166, second priority interrupt line 168, DR2 line 170, DR1 line 172, TRE1 line 174 and TRE2 line 176 to a positive five volts. Clock input to D-type flip flop 148 is supplied through inverter 186 on timer output line 184 from interrupt timer 182. Similarly, transistor 192 controls the clock signal to D-type flip flop 150 on clock line 190 from timer output line 188. The outputs ($\overline{Q}$) of D-type flip flops 148 and 150 are supplied as input to priority encoder 136 on lines 162 and 164, respectively. D-type flip flops 138, 140, 142, 144, 146, 148 and 150 have their data and set inputs connected to a logic one level of plus five volts.

Priority encoder 136 supplies an active low interrupt signal on interrupt ($\overline{INT}$) line 134 to microprocessor 100. A request for interrupt on ($\overline{INT}$) line 134 will be honored at the end of the current instruction if the internal software control enable flip flop is enabled, and the (NMI) line 132 is disabled, as will be further explained, since the ($\overline{BUSRQ}$) signal is not active. The encoded outputs of priority encoder 136 are supplied through tristate buffers 194 to data lines D1, D2 and D3 of data bus 200. Tristate buffers 194 are controlled by interrupt acknowledge line 196 at the output of OR gate 197 whose inputs are machine cycle one ($\overline{MI}$) line 234 and input output request ($\overline{I/ORQ}$) line 238.

Decoder 198 supplies the reset inputs to D-type flip flops 138, 140, 142, 144, 146, 148 and 150 on lines 228, 226, 224, 222, 220, 218 and 216 respectively. Inputs to decoder 198 are taken from address lines A0, A1 and A2 of address bus 202. Decoder 198 is enabled on active high enable line 208 through inverter 212 connected to address line A7 of address bus 202. Active low enable line 206 provides the output of NAND gate 210 whose three inputs are connected to address lines A4, A5 and A6 of address bus 202. A second active low enable line 204 is connected to the output of OR gate 244 whose inputs will be hereinafter more fully described.

Decoder 198 also supplies the data input signal on data line 214 to D-type flip flop 126 which has its reset held at a logic one. Clocking input to D-type flip flop 126 is from data line D0 of data bus 200 on clock lin 129. Non-maskable interrupt ($\overline{NMI}$) line 132 appears at the output of OR gate 130. Inverter 128 and the Q output of D-type flip flop 126 supply inputs to OR gate 130. ($\overline{NMI}$) line 132 has a higher priority than ($\overline{INT}$) line 134 and is always recognized at the end of the current instruction, independent of the status of the internal interrupt enable flip flop.

The control outputs of microprocessor 100 direct the operation of both devices associated with the CPU-console 90 and devices external to the CPU console 90. Memory write ($\overline{WR}$) line 230 is supplied as one input of OR gate 240. Memory request ($\overline{MERQ}$) line 232 furnishes the other input to OR gate 240. The output of OR gate 240 is then supplied to external circuitry through buffer 248 as memory write ($\overline{MW}$) line 256. ($\overline{MERQ}$) line 232 and memory read ($\overline{RD}$) line 236 input OR gate 242 to become memory read ($\overline{MR}$) line 258 through buffer 250. Simiarly, OR gate 244 has as inputs ($\overline{WR}$) line 230 and input/output request ($\overline{I/ORQ}$) line 238 to produce ($\overline{I/OW}$) line 260 through buffer 252. OR gate 246 has as input memory read ($\overline{RD}$) line 236 and ($\overline{I/ORQ}$) line 238 to furnish ($\overline{I/OR}$) line 262 through buffer 254. Interrupt acknowledge line 196 is obtained through OR gate 197 having as inputs ($\overline{MI}$) line 234 and ($\overline{I/ORQ}$) line 238.

The address lines of microprocessor 100 are applied to address bus 202 through tristate octal buffers 264.

The data lines of microprocessor 100 are applied to data bus 200 through bidirectional tristate octal buffer 266. Bidirectional tristate octal buffer 266 is controlled by the output on ($\overline{WR}$) line 230. A positive five volts is applied to data bus 200 through pull up resistor module 268. In like manner, a positive five volts is applied to address bus 202 through pull up resistor modules 270.

Figure 3A:
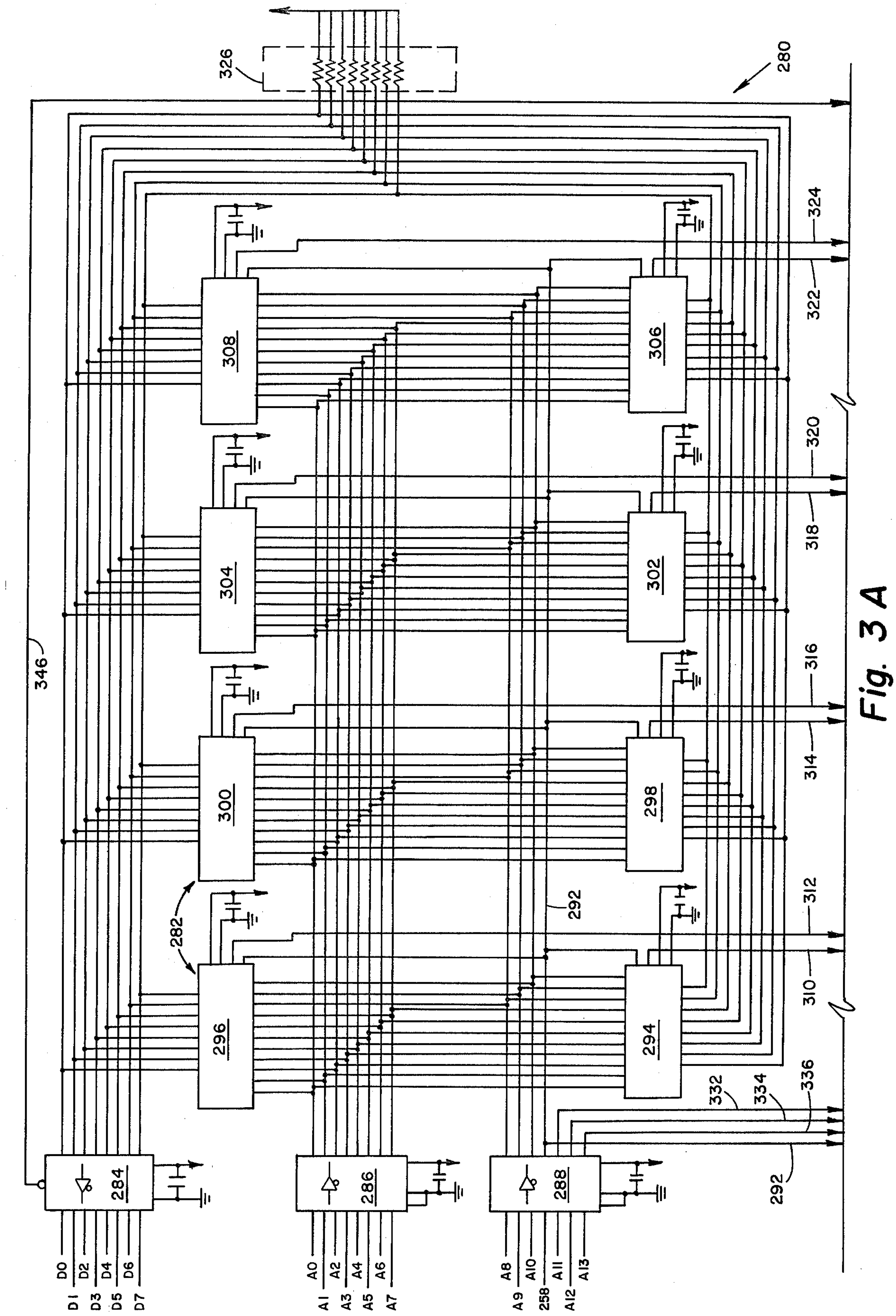
FIGS. 3A and 3B are an electrical schematic of the EPROM circuitry for use with the present invention.
Figure 3B:
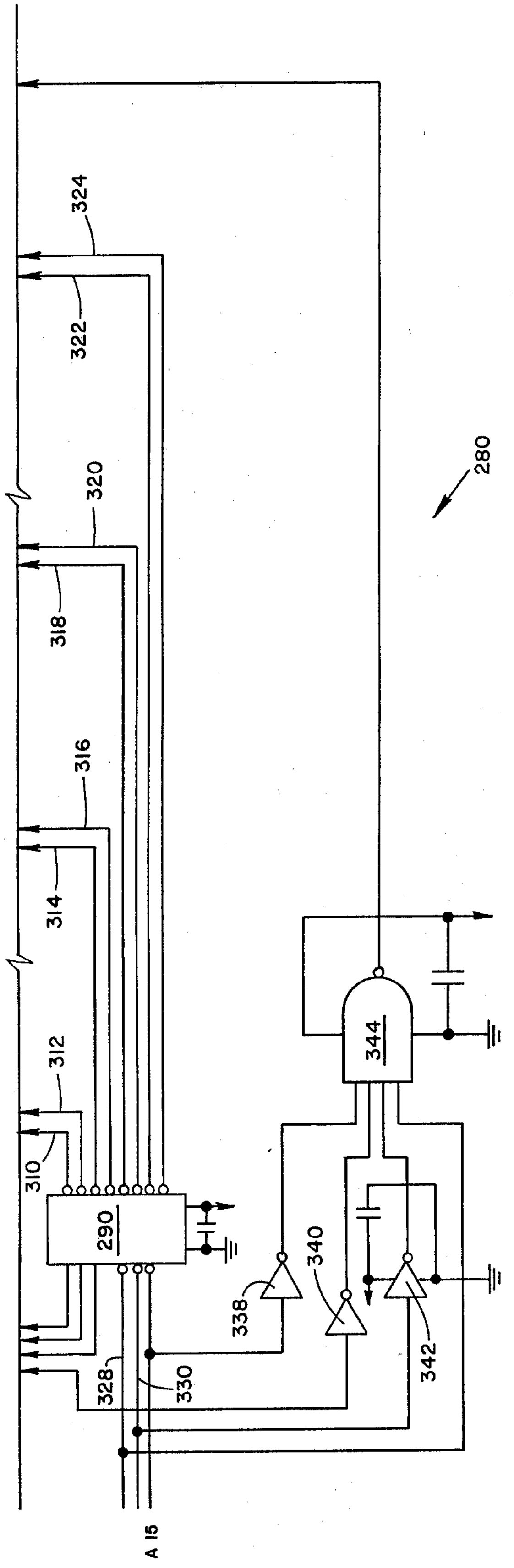

Referring now to FIGS. 3A and 3B the erasable programmable read only memory (EPROM) board 280 is illustrated. Although only a single EPROM board 280 is depicted, a second such circuit may be employed in the specific embodiment illustrated to provide more memory bytes. As shown, the EPROM board 280 comprises parallel connected MOSFET chips which may conveniently be erased and programmable such as read only memory (EPROM) chips 282 such as Intel U.V. EPROM 2716. EPROM chips 282 have eight data lines connected to data bus 200 through tristate octal buffer 284. The eleven address lines of EPROM chips 282 are connected to address bus lines A0 through A10 through buffers 286 and 288. Selection of the appropriate one of EPROM chips 282 is accomplished by address lines A11, A12 and A13 of address bus 202 appearing on input lines 332, 334 and 336, respectively through buffers 288. Input lines 332, 334, and 336 are applied to decoder 290 to accomplish the chip selection function. Enabling inputs to decoder 290 appear on select EPROM board 1 line 328, select EPROM board 2 line 330 and address line A15 of address bus 202. At the output of decoder 290, chip select line 310 selects EPROM 294; chip select line 312 selects EPROM 296; chip select line 314 selects EPROM 298; chip select line 316 selects EPROM 300; chip select line 318 selects EPROM 302; chip select line 320 selects EPROM 304; chip select line 322 selects EPROM 306 and chip select line 324 selects EPROM 308. ($\overline{MR}$) line 258 is applied through buffers 288 to the active low output enable ($\overline{OE}$) line 292 of EPROMS 294, 296, 298, 300, 302, 304, 306 and 308 to complete the chip select function. NAND gate 344 controls the output of EPROM board 280 to data bus 200 through tristate octal buffer 284. Address line A15 of address bus 202 is applied as one input to NAND gate 344 through inverter 338. A second input to NAND gate 344 is supplied on output enable ($\overline{OE}$) line 292 through inverter 340. A third enabling input to NAND gate 344 is supplied from select EPROM board 2 line 330 through inverter 342. A final enabling input to NAND gate 344 is supplied by select EPROM board 1 line 328. Therefore, the absence of a logic one level appearing on select EPROM board 1 line 328 will electrically isolate EPROM board 280 from data bus 200.

Figure 4A:
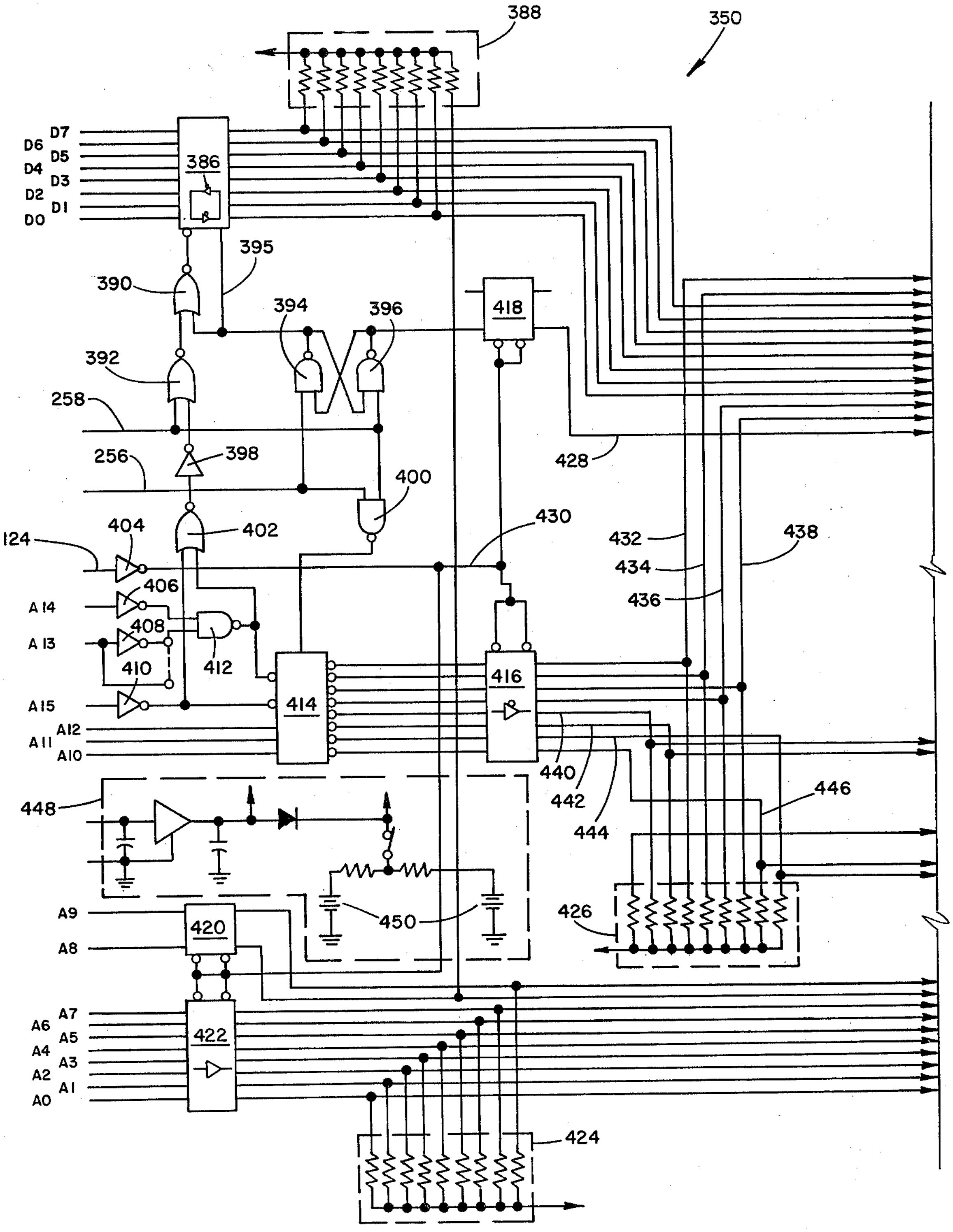
FIGS. 4A and 4B are an electrical schematic of the RAM circuitry for use with the present invention.
Figure 4B:
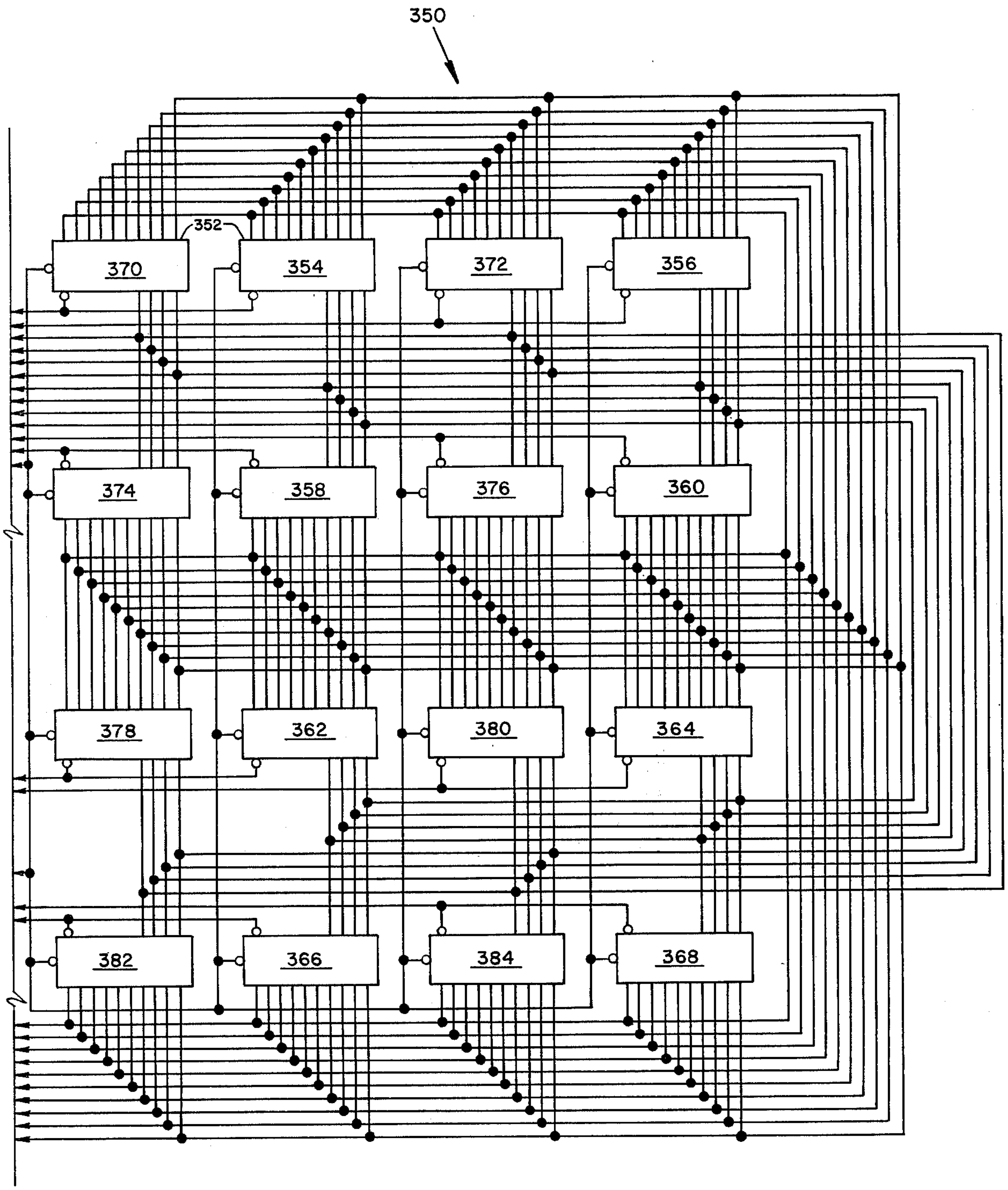

Referring now to FIGS. 4A and 4B, the RAM board 350 is illustrated. RAM board 350 comprises a number of CMOS RAM chips 352 having ten address lines and four bidirectional data lines. Data bus 200 is connected to the CMOS RAM chips 352 through bidirectional tristate octal buffer 386. The bidirectional data lines of CMOS RAM chips 352 are pulled high through pull up resistor module 388. Address lines A0 through A9 are electrically connected through tristate octal buffer 422 and tristate buffers 420 to the address lines of the CMOS RAM chips 352. Address lines A10, A11 and A12 are input to decoder 414 to control the chip select function. Address line A15 is applied through inverter 410 to an active low enabling input of decoder 414. The remaining active low enabling input of decoder 414 is supplied through NAND gate 412 having as inputs address lines A13 and A14 as inverted through inverters 408 and 406, respectively. The remaining active high enabling input of decoder 414 is furnished through NAND gate 400 having as inputs ($\overline{MW}$) line 256 and ($\overline{MR}$) 258. The decoded output of address lines A10, A11 and A12 through decoder 414 are applied to the chip select lines of the CMOS RAM chips 352 through tristate octal buffer 416. Chip select line 432 selects RAMs 370 and 354. Chip select line 434 selects RAMs 372 and 356. Chip select line 436 selects RAMs 374 and 358. Chip select line 438 selects RAMs 376 and 360. Chip select line 440 selects RAMs 378 and 362. Chip select line 442 selects RAMs 380 and 364. Chip select line 444 selects RAMs 382 and 366. Chip select line 446 selects RAMs 384 and 368. Chip select lines 432, 434, 436, 438, 440, 442, 444 and 446 are pulled high through pull up resistor module 426.

The active low enabling inputs to decoder 414 through NAND gate 412 and inverter 410 are applied as inputs to NOR gate 402 and through inverter 398 as one input to NOR gate 392. The remaining input to NOR gate 392 is taken from ($\overline{MR}$) line 258 which also furnishes one input to NAND gate 396 connected in latching configuration with NAND gate 394. The remaining input to NAND gate 394 is taken from ($\overline{MW}$) line 256. The output of NAND gate 394 is applied to active low read write ($\overline{R/W}$) line 395 to bidirectional tristate octal buffer 386. Bidirectional tristate octal buffer 386 is enabled through the output of NOR gate 390 having as inputs the output of NOR gate 392 and NAND gate 394. The output of NAND gate 396 is controlled through tristate buffer 418 to be applied to read/write line 428 interconnecting all of the CMOS RAM chips 352. Active low control inputs to tristate buffer 418, tristate octal buffer 416, tristate buffers 420 and tristate octal buffer 422 is supplied through inverter 404 on ($\overline{RST}$) line 124.

Due to the volatile memory characteristics of the CMOS RAM chips 352 battery back up circuit 448 is furnished including batteries 450. In the event of a general circuit power failure, batteries 450 can apply sufficient DC current to the CMOS RAM chips 352 to retain any information therein stored.

Figure 5A:
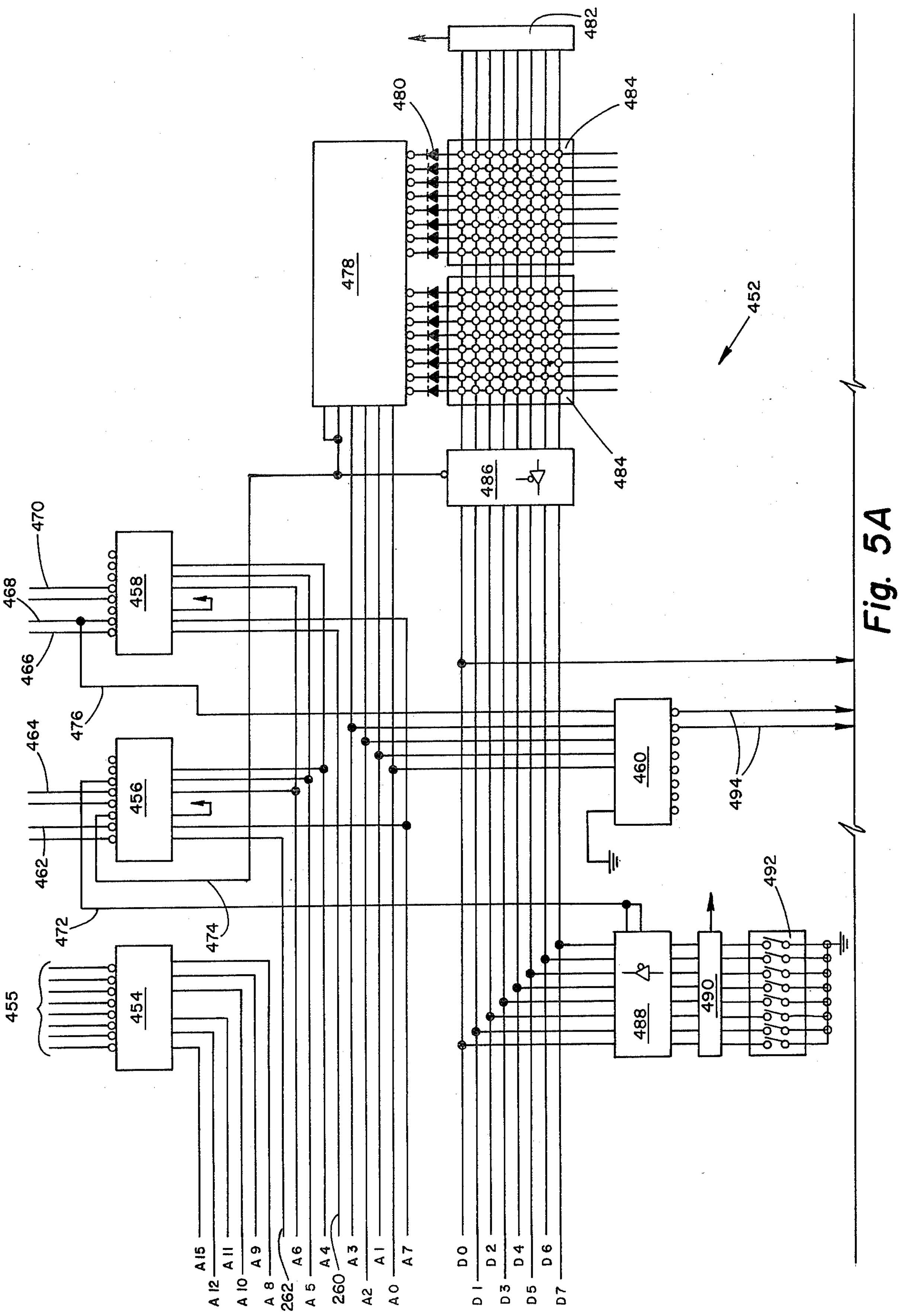
FIGS. 5A and 5B are an electrical schematic of the RAM select/strobe board, which includes dispenser scan matrix switching, slow flow offset switches and select/strobe circuitry of the present invention.
Figure 5B:
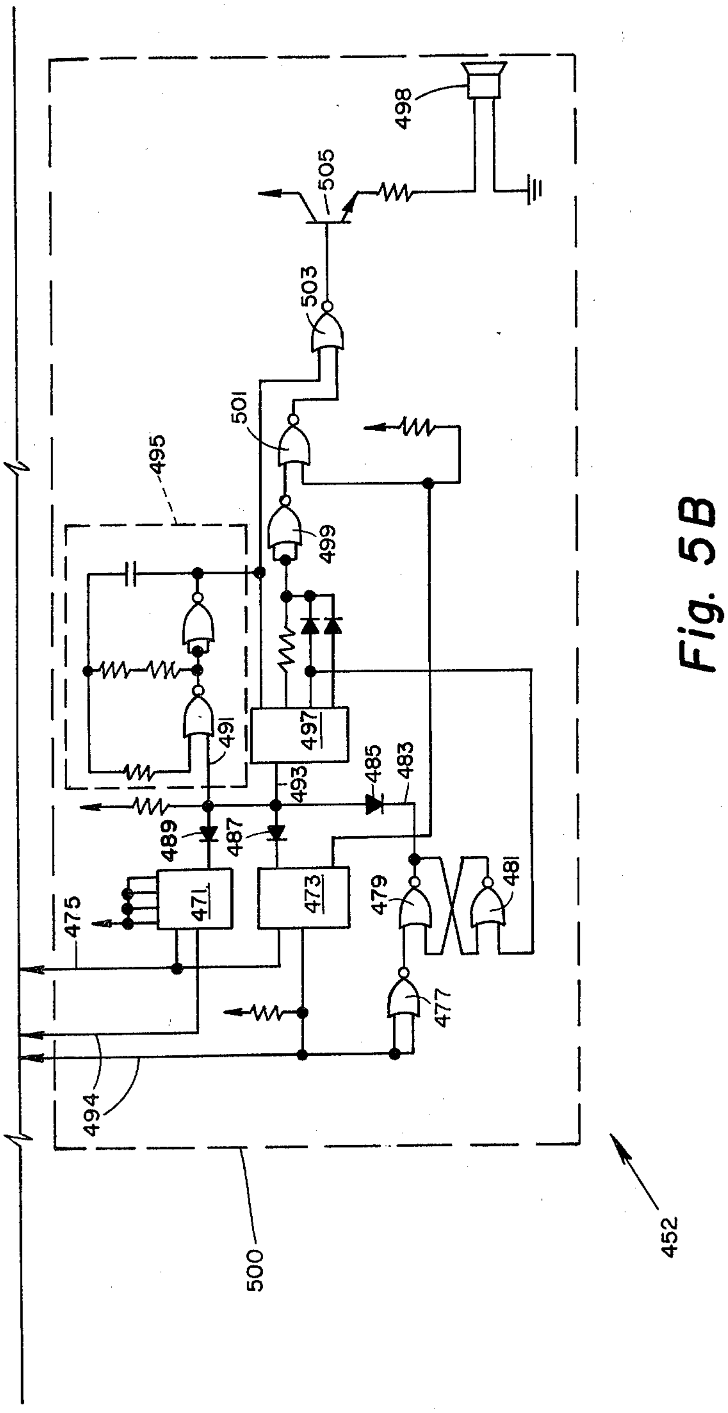
Figure 12:
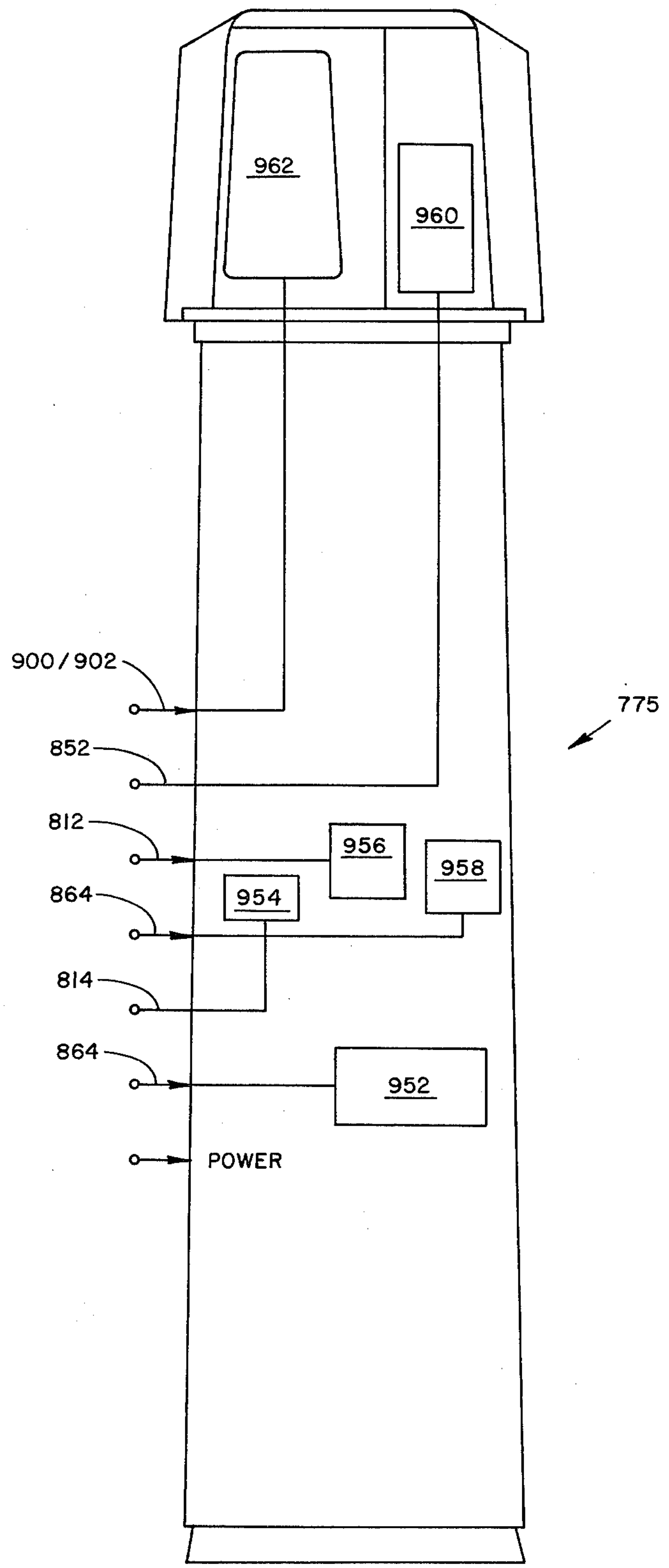
FIG. 12 is a simplified block diagram of a typical dispenser for use in accordance with the present invention.

Referring now to FIGS. 5A and 5B the RAM select/-strobe board 452 of the invention is illustrated. In this circuit, information as to the number of dispensers 775, FIG. 12, their respective grades of fuel, and the amount of slow flow offset of a preset liquid dispensing operation is applied to data bus 200. Address lines A0 through A3 of address bus 202 are applied as inputs to four line to sixteen line decoder 478. The outputs of four line to sixteen line decoder 478 are applied through diodes 480 to a pair of slide switch matrices 484. Each matrix 484 includes eight slide switches which correspond respectively to eight dispensers 775, one of which is shown in FIG. 12. Accordingly, the two eight-switch two 484 matrices taken together can preset data for sixteen dispensers. In the preferred embodiment, the CPU-console 90 is capable of processing data for up to five different grades of fuel, with each of sixteen dispensers delivering a pre-selected one of the grades. The various grades of fuel may be recognized as regular, premium, unleaded, premium unleaded and diesel. In this embodiment, each of the slide switches must be set to one of switch positions 1 through 5, corresponding to the grade of fuel dispensed at that particular dispenser. If a slide switch in the matrix corresponds to an unused or non-existent dispenser (for instance if the station had only twelve dispensers) the slide switch is set to position eight which informs the microprocessor 100 that that particular dispenser is not in use. The position of the slide switches on slide switch matrices 484 supplies information to data bus 200 through tristate octal buffer 486, the signals thereon being pulled to +5 volts by resistor module 482, as to the respective grades of fuel available for dispensing at a given dispenser 775 as shown in FIG. 12. Additionally, moving the slide switch on the slide switch matrices 484 to the eighth position thereof indicates to microprocessor 100 that the dispenser 775 corresponding to such numbered switch is not to be polled. As set forth hereinafter, the information supplied to the data bus 200 as derived from the slide switch matrices 484 will increase the processing speed of the system by reducing the number of polling signals necessary for the system to function.

SPST switch block 492 programs, in terms of volume, the point at which the slow flow mode is actuated in a preset dispensing operation.

As is well known in the art, the slow flow mode in fuel dispensers is used to reduce the flow rate of such fuel through a dispenser outlet when a preset cutoff point is near. For example, in a prepay system a customer will pay for a certain amount of fuel, such as a five dollar sale, which may correspond to five gallons at one dollar per gallon. The dispenser will pump the fuel to the outlet at a relatively fast rate for the first 4.65 gallons. At that point however, the slow flow valve 958 (FIG. 12) comes into control and the flow rate is reduced substantially so that the flow can be stopped nearly instantaneously when the preset cutoff is reached. The switch block 492 may have incremental volume levels associated with each switch, for example in 0.05 unit volume increments (such as gallons or liters). In this way, the slow flow initiate point can be incrementally stepped back from zero slow flow actuation, to actuation at 0.05 unit volume from total sale, to 0.10, 0.15, etc. The output of SPST switch block 492 is pulled high through pull up resistor module 490 and applied to data bus 200 through tristate octal buffer 488.

Address lines A4, A5 and A6 of address bus 202 are decoded through decoder 458 to produce I/O write strobe signals on lines 466, 468 and 470. Address line A7 of address bus 202 provides one active low enabling input to decoder 458. A second active low enabling input is provided to decoder 458 through ($\overline{I/OW}$) line 260. I/OW0 line 466 provides a strobe signal to function display 586. I/OW1 line 468 supplies a strobe signal to keyboard and display interface 502. Annunciator control line 476 connects I/OW1 line 468 to an active low enabling input of decoder 460 as will be hereinafter more fully described. I/OW4 line 470 furnishes a WRITE strobe signal to peripheral UART 644 and dispenser UART 646 as shown in FIG. 10.

Address lines A4, A5 and A6 also supply input to decoder 456. Address line A7 of address bus 202 supplies one active low enabling input to decoder 456. A second active low enabling input is supplied on (I/OR) line 262. At the output of decoder 456, I/OR1 line 462 furnishes a read strobe signal to keyboard and display interface 502. I/OR4 line 464 supplies a read strobe signal to peripheral UART 644 and dispenser UART 646. Slow flow offset control line 472 provides control input to tristate octal buffer 488. Grade and dispenser control line 474 supplies control input to four line sixteen line decoder 478 and tristate octal buffer 486.

Address lines A8, A9 and A10 of address bus 202 are decoded through decoder 454 to provide RAM select signals on lines 455. Active low enabling inputs to decoder 454 are supplied on address lines A11 and A12 of address bus 202 while a single active high enabling input is supplied on address line A15.

Address lines A0, A1 and A2 of address bus 202 are decoded through decoder 460 to provide control inputs to annunciator 500. Address line A3 of address bus 202 supplies an active high enabling input while annunciator control line 476 provides an active low enabling input to decoder 460. The output lines 494 of decoder 460 cause annunciator 500 to emit through speaker 498 either a normal key chirp of one half second in duration; an attention signal of four half second chirps; a continuous tone signal indicating power failure; or a two second tone indicating a collect signal. See FIG. 7.

The annunciator circuit 500 as is shown in FIG. 5B receives the output lines 494 from decoder 460 at the clock inputs to a pair of D-type flip-flops 471 and 473. D inputs to the flip-flops 471 and 473 are supplied, via line 475, by the data bus line DO (FIG. 5A). One of the decoder output lines 494 is further connected to a NOR-inverter 477, the output of which serves as input to a pair of NAND gates 479 and 481 connected in a flip-flop arrangement. When the output of gate 479 goes to logic 0, the potential at diode 485 is a relative ground thus causing diodes 487 and 489 to function as a NOR gate. The $\overline{Q}$ output of flip-flop 471 and the Q output of flip-flop 473 are NORed together to provide output on lines 491 and 493. Line 491 is the enabling input to an oscillator 495. Line 493 is the enabling input to a binary counter 497. The outputs of binary counter 497 are routed through NOR gates 499 and 501 to serve as one input to NOR gate 503. Oscillator 495 provides the other input to NOR gate 503, the output of which serves as the base driver for emitter follower 505. Speaker 498 is the emitter load impedence and chirps on the presence of a signal at the base of the emitter follower 505.

Figure 6A:
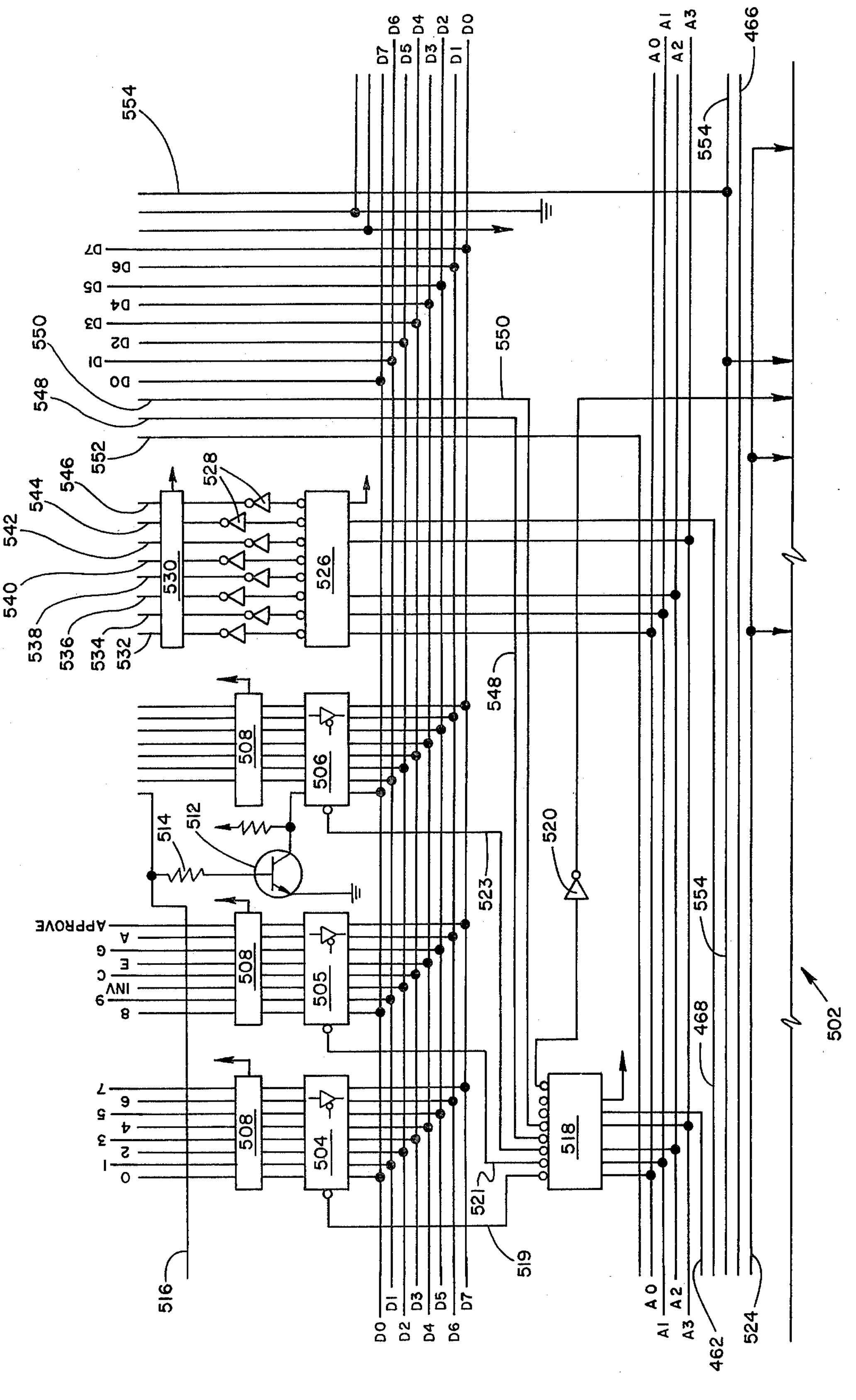
FIGS. 6A and 6B are an electrical schematic of the key board and display interface circuitry of the present invention.
Figure 6B:
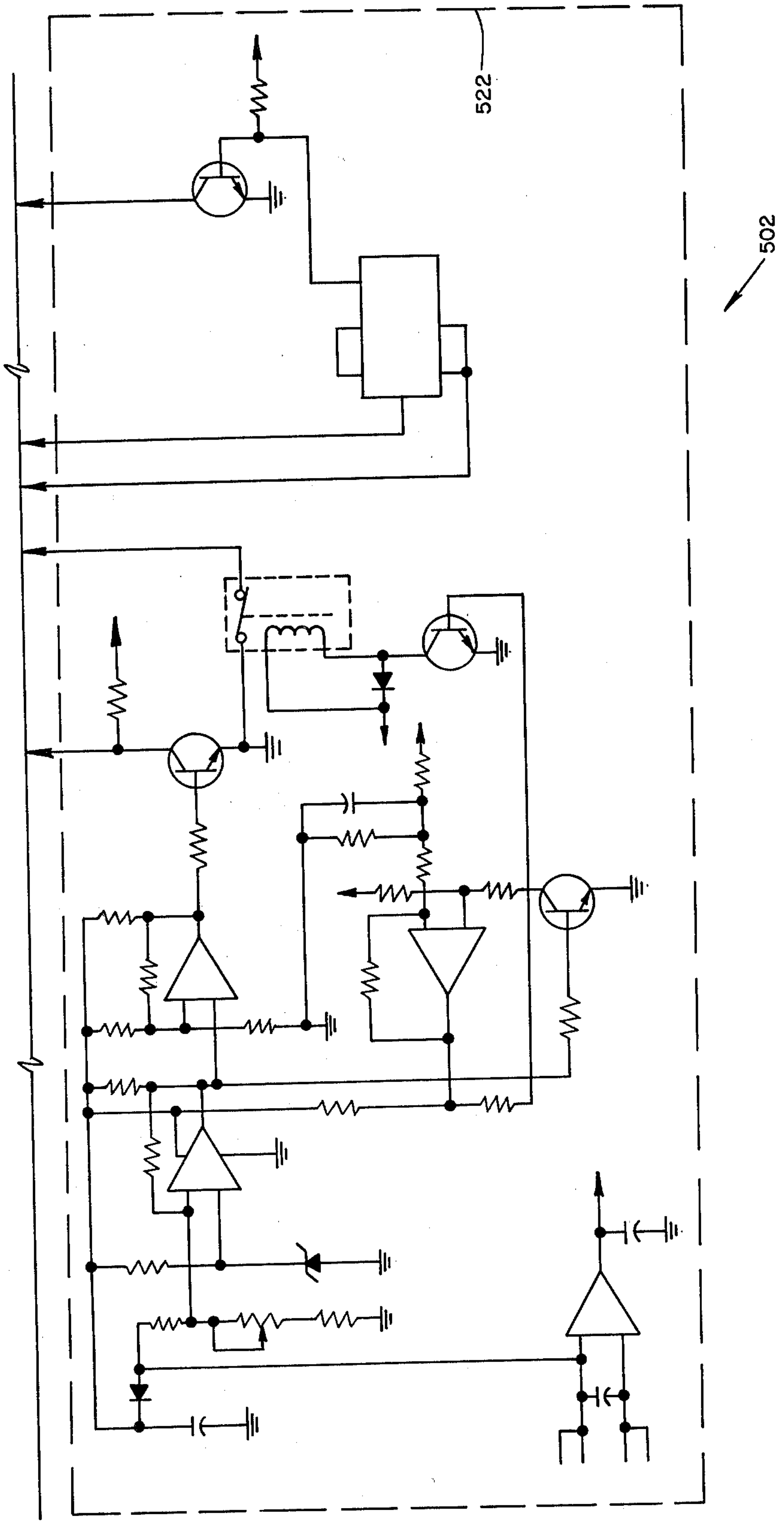

Referring now to FIGS. 6A and 6B the keyboard and display interface 502 of the invention is shown. The interface board 502 directs all the bidirectional signal flow between the address address and data busses 202 and 200, respectively, and the displays and keyboards 510, 586, 622 and 637. Data entered by means of function key board 510 is input to data bus 200 through tristate octal buffers 504, 505 and 506 on lines pulled high by pull up resistor modules 508. The output of the emergency stop switch 576 of function key board 510 is supplied on line 516 through resistor 514 to the base lead of transistor 512. In this common emitter configuration, the collector of transistor 512 is applied to data line D0 of data bus 200 through tristate octal buffer 506.

Address lines A0, A1 and A2 are decoded through decoder 518 to control tristate octal buffers 504, 505 and 506 by means of control lines 519, 521 and 523, respectively. Active low enabling inputs to decoder 518 are taken from address line A3 of address bus 202 and I/OR1 line 462. Status key strobe lines 548 and 550 at the output of decoder 518 supply strobe signals to status displays 637 of dispensers 9 through 16 and 1 through 8 respectively. See FIG. 9. An additional output of decoder 518 is applied through inverter 520 to reset circuit 522. The purpose of the reset circuit 522 (FIG. 6B) is to initialize the circuits of CPU-console 90 at the time of system start-up. Further, the reset circuit 522 monitors the system power at all times to insure that the voltage levels supplied to the various circuits of the system are sufficient to keep them operating correctly. Reset circuit 522 has an additional input from back plane oscillator line 554 to supply a reset out signal on reset out line 524.

Address lines A0, A1 and A2 also furnish inputs to decoder 526. Active low enabling inputs to decoder 526 are supplied from address line A3 of address bus 202 and I/OW1 line 468. The output of decoder 526 is inverted through inverters 528 and pulled high by pull up resistor module 530 to form status LCD strobe lines 532, 534, 536, 538, 540, 542, 544 and 546. Status LCD strobe line 532 strobes dispensers 1 and 2. Status LCD strobe line 534 strobes dispensers 3 and 4. Status LCD strobe line 536 strobes dispensers 5 and 6. Status LCD strobe line 538 strobes dispensers 7 and 8. Status LCD strobe line 540 strobes dispensers 9 and 10. Status LCD strobe line 542 strobes dispensers 11 and 12. Status LCD strobe line 544 strobes dispensers 13 and 14. Status LCD strobe line 546 strobes dispensers 15 and 16.

Figure 7:
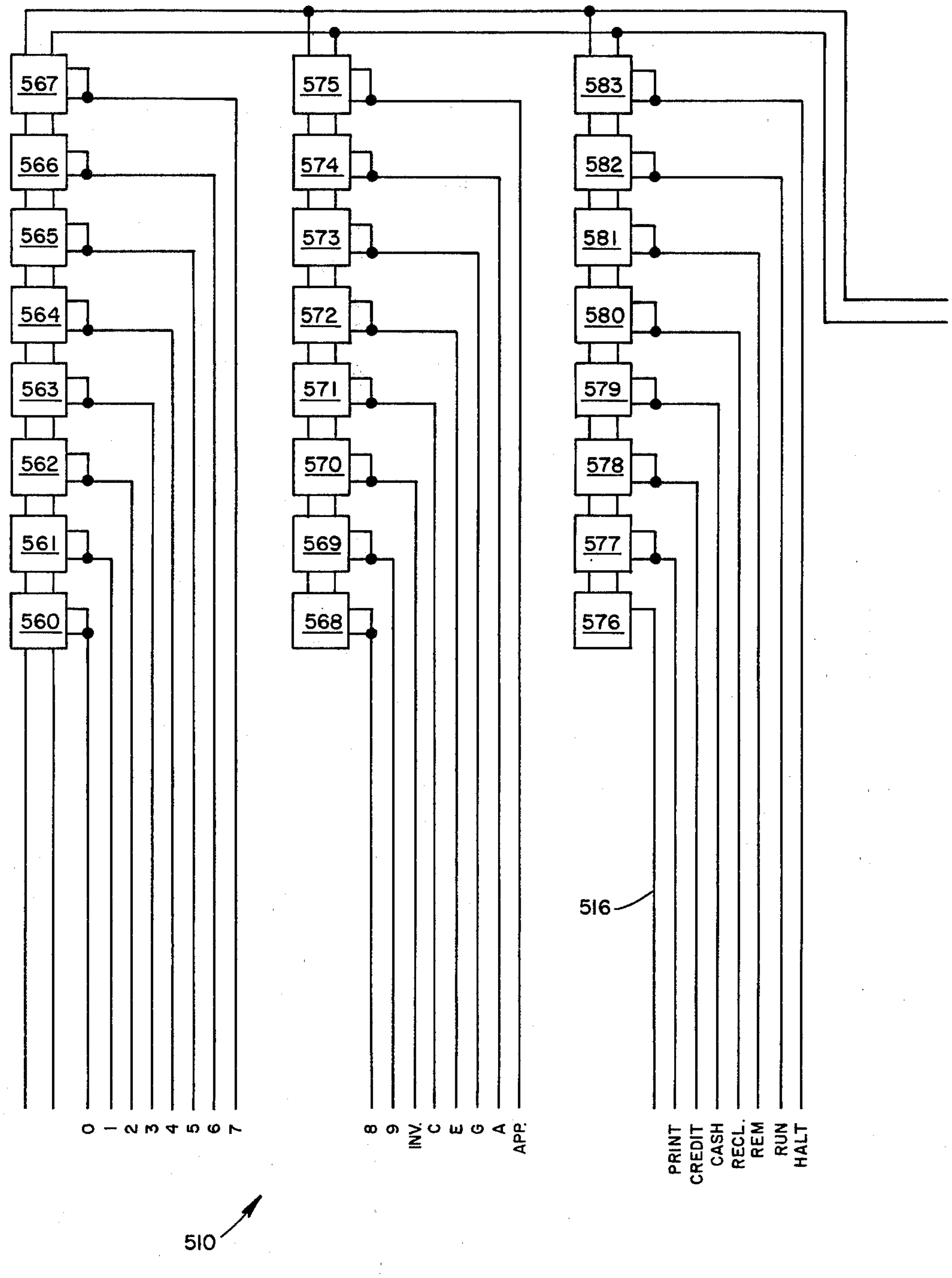
FIG. 7 is an electrical schematic of the function key board for use with the present invention.

As illustrated in FIG. 7 function keyboard 510 supplies data input to data bus 200 through tristate octal buffers 504, 505 and 506 of keyboard and display interface 502 as shown in FIG. 6. Switches 560, 561, 562, 563, 564, 565, 566 and 567 supply input to data bus 200 through tristate octal buffer 504. Switches 568, 569, 570, 571, 572, 573, 574 and 575 supply input to data bus 200 through tristate octal buffer 505. Switches 577, 578, 579, 580, 581, 582 and 583 supply input to data bus 200 through tristate octal buffer 506. Switch 576 supplies output on emergency stop line 516 to cease dispensing operations of all dispensers by electrically isolating them from their power supplies. In addition, transistor 512 as shown in FIG. 6 causes an indication of actuation of switch 576 to appear on data line D0 of data bus 200 through tristate octal buffer 506.

Figure 8A:
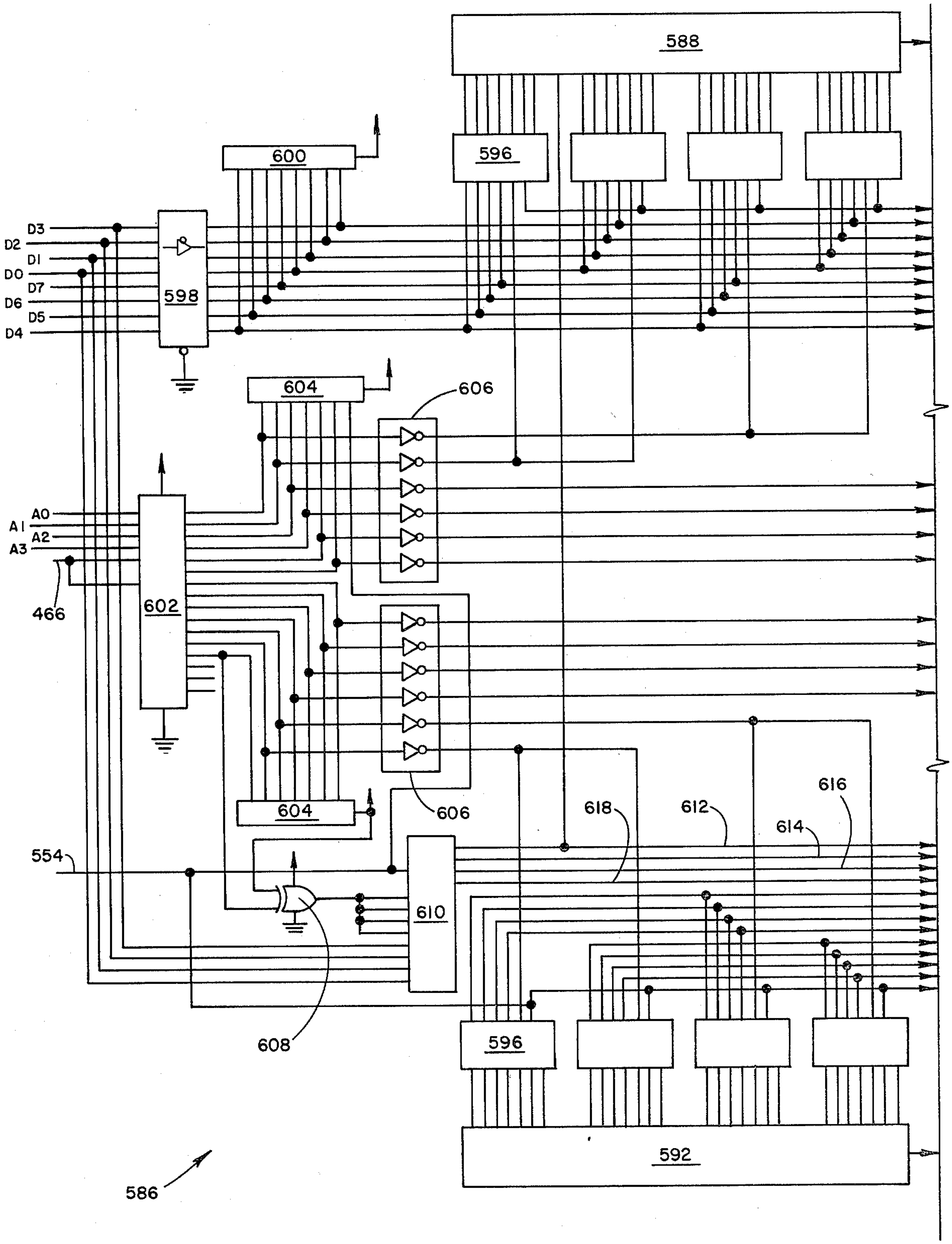
FIGS. 8A and 8B are an electrical schematic of the function display circuitry of the present invention.
Figure 8B:
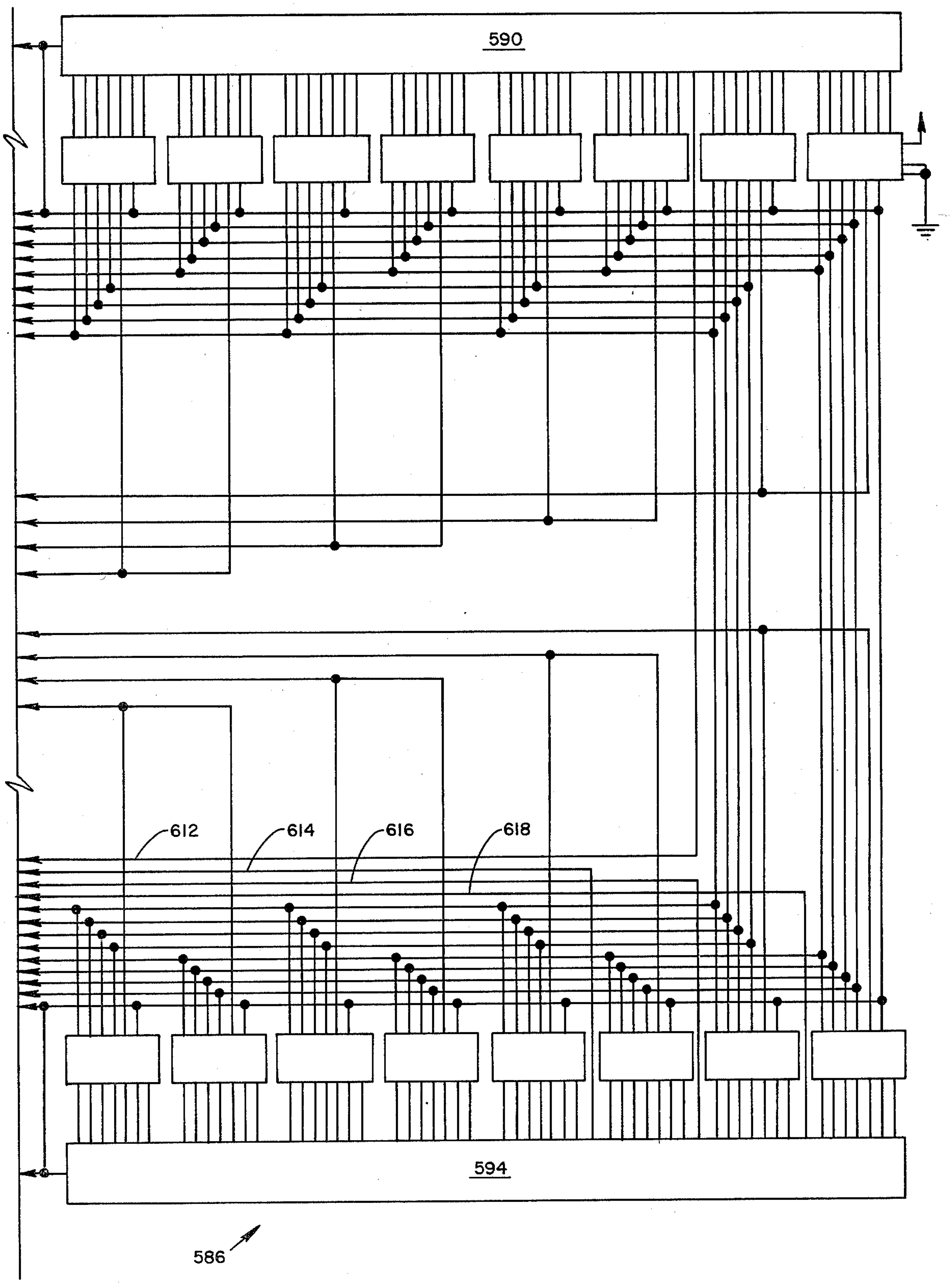

Referring now to FIGS. 8A and 8B, the function display panel 586 of the invention is shown. Data is input to function display panel 586 from keyboard and display interface 502 on data lines D0 through D7 of data bus 200 through octal buffer 598. The output of octal buffer 598 is pulled high by pull up resistor module 600. BCD to seven segment decoder drivers 596 have as inputs either data lines D0 through D3 or D4 through D7 of data bus 200. The lines D0 through D3 being the least significant digits and the lines D4 through D7 being the most significant. Back plane oscillator line 554 further connects all BCD to seven segment decoder drivers 596 in parallel. The seven segment line output of BCD to seven segment decoder drivers 596 control the visual indications of the function display panel 586 comprising price per volume LCD display 588, money LCD display 590, dispenser/grade LCD display 592 and volume LCD display 594. Address lines A0, A1, A2 and A3 of address bus 202 are input to four line to sixteen line decoder 602. Active low enabling input is also supplied to four line to sixteen line decoder 602 from I/OWO line 466. The output of four line to sixteen line decoder 602 is pulled high by pull up resistor modules 604 and inverted through hex inverters 606. The decoder output of four line to sixteen line decoder 602 supplies enabling inputs to BCD to seven segment decoder drivers 596.

Back plane oscillator line 554, pulled high by pull up resistor module 604, also furnishes enabling input to four segment display driver 610. Additionally, enabling inputs to four segment display driver 610 are supplied through exclusive OR gate 608 having one input held at a logic one level and the other input connected to the decoder output of four line to sixteen line decoder driver 602. Decimal line 612 at the output of four segment display driver 610 causes a visual decimal indication in price per volume LCD display 588 and money LCD display 590. Thousandths volume decimal line 614 causes a visual indication of a decimal location corresponding to a thousandth of volume on volume LCD display 594. Likewise volume displays of hundredths and tenths of volume are indicated by decimal locations on volume LCD display 594 as driven by signals on hundredths volume decimal line 616 and tenths volume decimal line 618, respectively.

Figure 9:
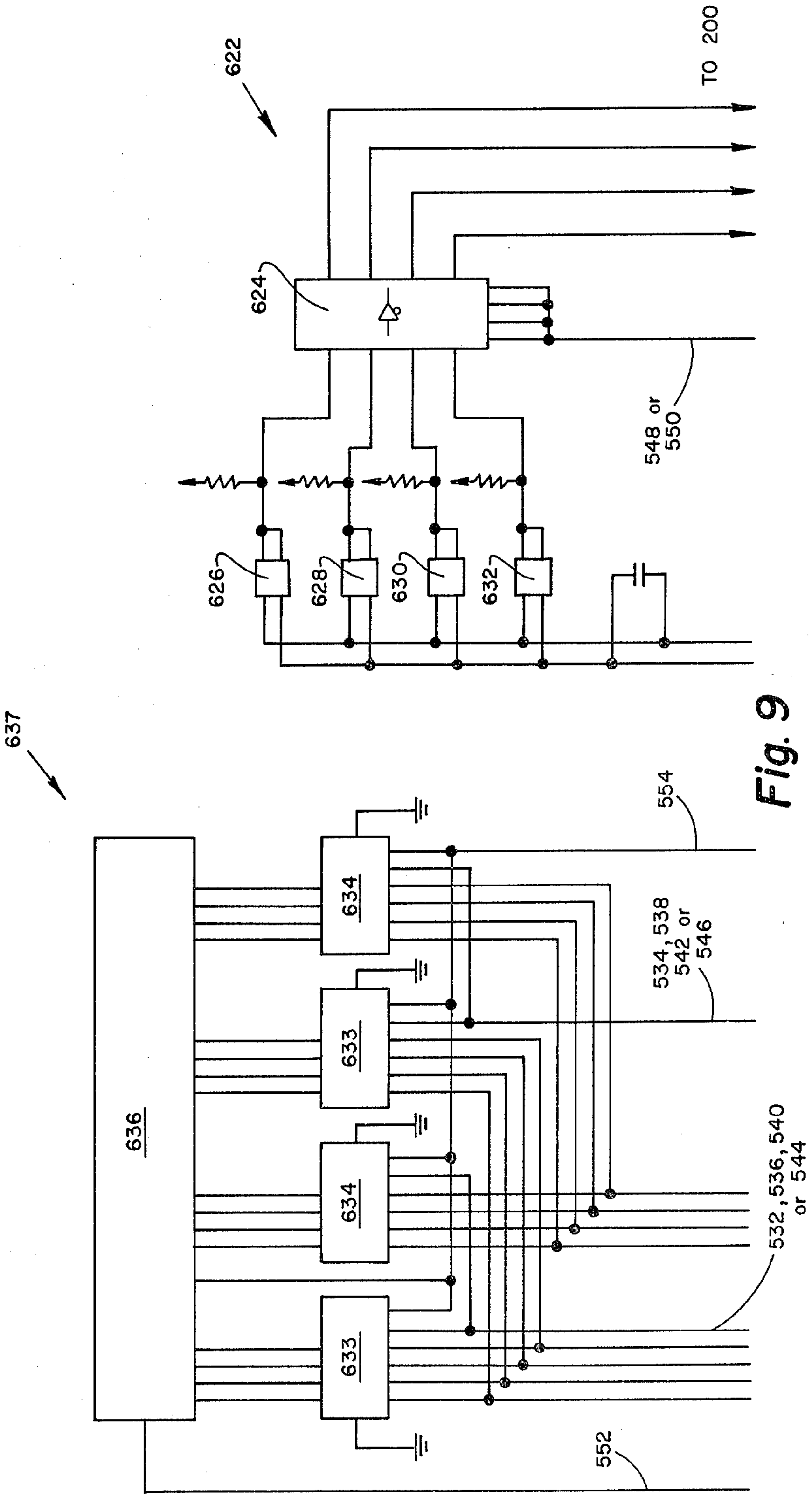
FIG. 9 is an electrical schematic of the status key board and status display circuitry of the present invention.

Referring now to FIG. 9, the status key board 622 and status display 637 of the invention are illustrated. Although but a single status key board 622 and status display 637 are shown, up to four of each units may be utilized to monitor and control operation of up to sixteen dispensing stations.

Status key board 622 comprises four dispenser switches 626, 628, 630 and 632. Configured as shown, dispenser switch 626 would operably control either dispensers 1, 5, 9 or 13. Similarly, dispenser switch 628 would operably control dispensers 2, 6, 10 or 14. Dispenser switch 630 would control dispenser 3, 7, 11 or 15. Dispenser switch 632 would control dispenser 4, 8, 12 or 16. The output signal from status key board 622 are applied to the data lines of data bus 200 through tristate quad buffer 624. Tristate quad buffer 624 is controlled by status key strobe line 548 when status key board 622 is used with dispensers 1 through 8 and status key strobe line 550 when used with dispensers 9 through 16. Information relative to the position of dispenser switches 626, 628, 630 and 632 is input to data lines D0, D1, D2 and D3 of data bus 200 when status key board 622 is used to control dispensers 1 through 4 and 9 through 12. Likewise, the positions of status key board 622 dispenser switches 626, 628, 630 and 632 is input to data lines D4, D5, D6 and D7 of data bus 200 when used to control dispensers 5 through 8 and 13 through 16.

Status display 637 comprises an LCD display giving two indications of a visual collect signal, a dispenser on condition, and a dispenser approved signal. Additionally, a signal on collect level 2 line 552 places a visual indication of a horizontal line across LCD display 636 indicating that a sale stacking operation is available to the operator. LCD display 636 is driven by four segment display drivers 633 and 634. Information to four segment display drivers 633 is taken from data lines D4 through D7 of data bus 200. Information to four segment display drivers 634 is taken from data lines D0 through D3 of data bus 200. When status display 637 is utilized to display information for dispensers 1 through 4, it is strobed by status LCD strobe lines 532 and 534 from display interface board 502. See FIG. 6. When used to display information from dispensers 5 through 8, status display 637 is strobed by status LCD strobe lines 536 and 538. When used to display information from dispensers 9 through 12, status LCD strobe lines 540 and 542 are utilized. When used to display information relative to dispensers 13 through 16, status LCD strobe lines 544 and 546 are utilized.

Figure 10A:
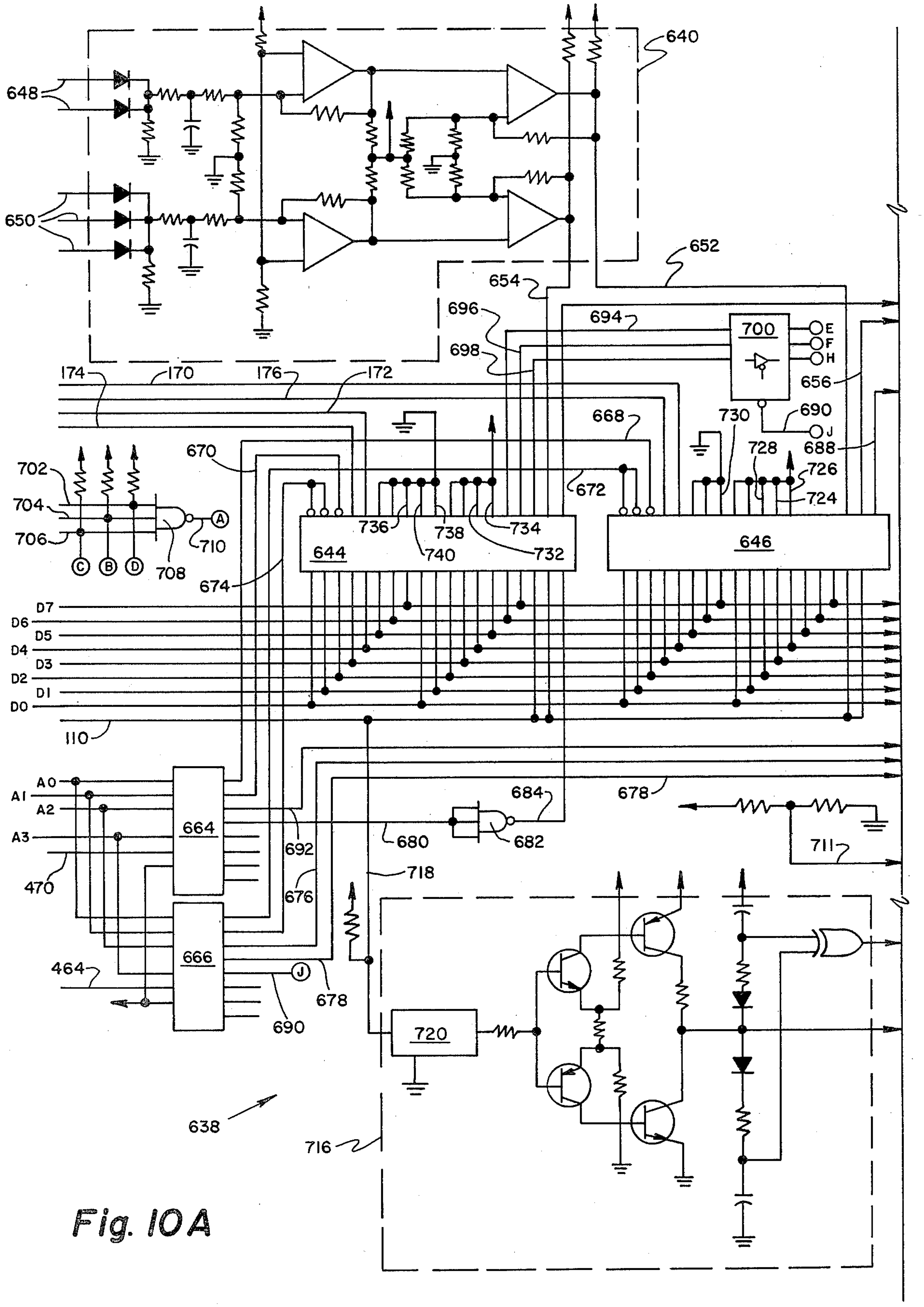
FIGS. 10A and 10B are an electrical schematic of the UART board for use with the present invention.
Figure 10B:
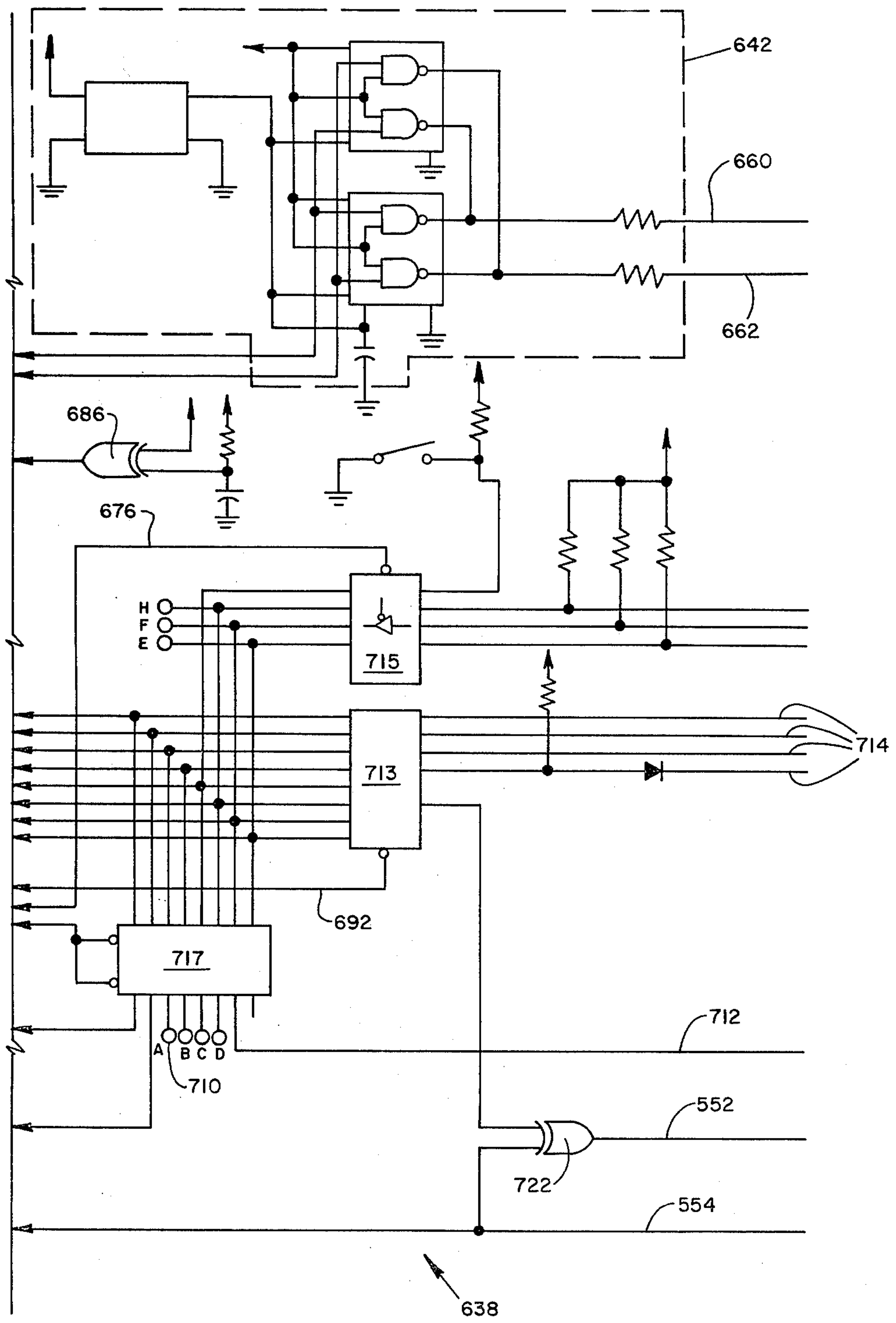

Referring now to FIGS. 10A and 10B, the UART board of applicant's invention is shown. While a peripheral UART 644 is illustrated for interfacing with future dispensing microcomputers, discussion of dispenser UART 646 will suffice in description of the operation and control circuitry of both. Information to UART board 638 is input serially on dispenser talk to console lines 648. Information on dispenser talk to console lines 648 is serially input with a character format of eight data bits with one start and one stop bit at a 9600 baud rate. Serial data input to dispenser UART 646 is made on receiver register input line 652. Serial data output of dispenser UART 646 to serial output driver 642 occurs on transmitter register output line 656. Output to remote dispensers 775 from driver 642 is made on console talk to dispenser line 662.

Dispenser UART 646 is a conventional parallel in serial out and serial in parallel out device. It has eight receiver buffer registers and eight transmitter buffer registers. Dispenser UART 646 as shown is a Harris Corporation HD-6402 CMOS/LSI universal asynchronous receiver transmitter (UART).

Dispenser UART 646 has its receiver buffer registers and transmitter buffer registers attached to data bus 200 for transmission and reception of data. Its receiver register clock line and transmitter register clock line are connected to UART clock line 110. A baud rate of 9600 is set by the 153.6 kilohertz UART clock line which is sixteen times the data rate.

Address lines A0, A1 and A2 of address bus 202 are decoded through decoders 664 and 666. Active low enabling inputs to decoders 664 and 666 are obtained from address line A3 of address bus 202. Decoder 664 obtains a further active low enabling input from I/OW4 line 470. A second active low enabling input to decoder 666 is obtained from I/OR4 line 464. Output of decoder 664 is provided to dispenser UART 646 on transmitter buffer register load line 668. A third output of decoder 664 on line 692 controls octal buffer 713 as shall be more fully described hereinafter. Master reset line 688 of dispenser UART 646 appears at the output of exclusive OR gate 686 as shown.

Decoder 666 output on data received reset/receiver register disable line 672 is input to dispenser UART 646. Control line 676 from decoder 666 controls tristate quad buffer 715 as shall be more fully described hereinafter. Similarly, control line 678 controls tristate octal buffer 717 while control line 690 controls tristate buffers 700.

Dispenser UART 646 is set to a character format of eight data bits, one stop and start bit, with no parity bit, by connecting character length select 2 (CLS2) line 724, character length select 1 line (CLS1) 726 and parity inhibit (PI) line 728 to a logic one level while stop bit select (SBS) line 730 is held at a logic zero. A control output signal of dispenser UART 646 indicating data received are output to interrupt control circuitry 125 on dispenser data received ready (DR2) line 170. See FIG. 2. A transmitter register empty signal from dispenser UART 646 is input to interrupt control circuitry 125 on dispenser transmit register empty (TRE2) line 176.

Information as to the interruption of power to the respective power supplies of the invention is input on console power interrupt line 702 and power interrupt lines 704 and 706 to NAND gate 708 and through tristate octal buffer 717 to data lines D2, D4, D3 and D5 respectively. A loss in twelve volt power would be sensed by DC voltage line 711 for input through tristate octal buffer 717 to data line D7 of data bus 200. External batteries may be monitored by battery monitor line 712 through tristate octal buffer 717 to data line D1. Further inputs to data bus 200 are made through tristate quad buffer 715 as to other functions of the invention. Outputs to control and test the various power supplies are made through octal buffer 713 on battery control lines 714.

Back plane oscillator input line 718 from UART clock line 110 provides input to back plane oscillator 716. Output of back plane oscillator 716 to function display 586 and status display 637 is made on back plane oscillator line 554. The collect level 2 line 552 to status display 637 is taken from the output of exclusive OR gate 722 having as inputs back plane oscillator line 554 and the output of data line D2 of data bus 200 through octal buffer 713.

Figure 11:
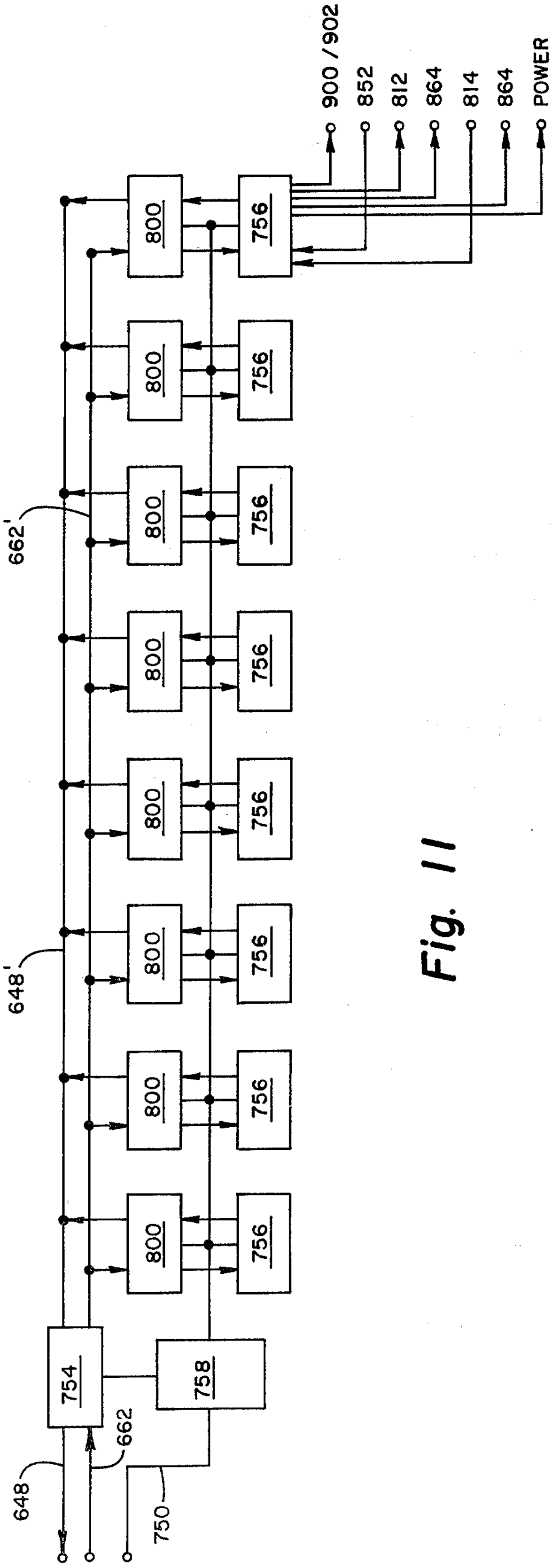
FIG. 11 is a simplified block diagram of the input/output, microcomputer and dispenser controller circuit in accordance with the present invention.

Referring now to FIG. 11 a series of remote terminal 800 of the device are shown. In operation, up to eight remote terminals 800 may be used to communicate through a single input/output board 754 to CPU-console 90. By utilizing two parallel connected input/output boards 754, up to sixteen remote terminals 800 may be incorporated into the system. Input/output boards 754 consist of receiver/driver amplifiers for interfacing up to eight terminal talk to console lines 648' to terminal talk to console line 648 to UART 646. Likewise, input-/output board 754 interfaces a single console talk to terminal line 662 to up to eight console talk to terminal lines 662'. A DC common line 750 also interconnects the power supply of CPU-console 90 to the power supply 758 of remote terminals 800. A dispenser controller 756 is interposed between each of the terminals 800 and their respective dispenser 755. The controller 756 includes conventional relays and opto-isolators to prevent damage to the terminal 800 in the event of miswiring or malfunction at the dispenser 775.

Referring now to FIG. 12, a dispenser 775 associated with a particular remote terminal 800 is operatively controlled through the dispenser controller 756 as shown in FIG. 11. Similarly, input pulses from pulser 954 and a reset signal from handle reset 960 to a remote terminal 800 are controlled through a dispenser controller 756.

Figure 13:
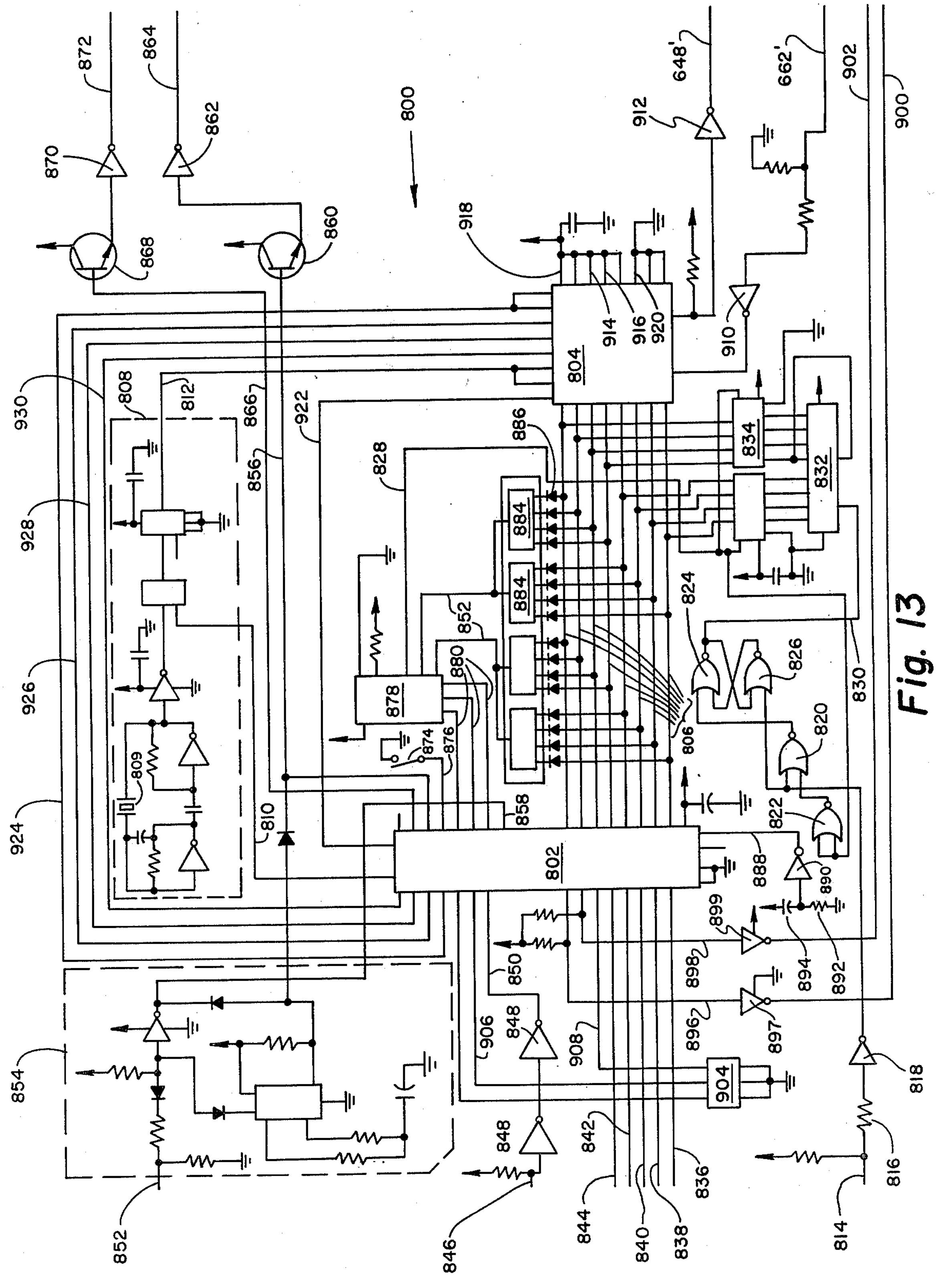
FIG. 13 is an electrical schematic of a remote terminal circuitry of the present invention.

Referring now to FIG. 13, remote terminals 800 consist in essense of a micro computer 802, a UART 804 and interconnecting data bus 806 along with additional circuitry to interface thumb wheel switches, pulse counters and other input circuitry. UART 804 may conveniently be the same unit utilized for dispenser UART 646. Micro computer 802, as shown, may be a MOSTEK F8 single chip microcomputer Mk3870 or other similar chip having an internal ROM and scratch pad RAM.

A unique address for micro computer 802 is established at Port 0 thereof, by establishing varying logic one or logic zero levels on identifier one bit line 836, identifier two bit line 838, identifier four bit line 840 and identifier eight bit line 842. Information to microcomputer 802 as to the utilization of either 56 or 80 bit data streams for interfacing with existing dispenser display 962 systems may be input on data line 844 to Port 0.

Input to a remote terminal 800 from pulse source 954 producing pulses related to a given volume of fuel dispensed is on pulse input line 814. Such pulse producing circuitry is well known in the industry and may be conveniently furnished in form similar to that disclosed in U.S. Pat. No. 3,813,527, issued May 28, 1974 to Earl M. Langston and assigned to the assignee of the present invention. Pulses on pulse input line 814 pass through resistor 816 and inverter 818 for input to NOR gate 820. NOR gate 820, operating in conjunction with inverter 822 as controlled by pulse inhibit line 828 serves to suspend the pulse input to latching NOR gates 824 and 826. The output of NOR gate 824 is applied to the input of dual binary up counter 832 on pulse output line 830. The output of dual binary up counter 832 is applied to data bus 806 through tristate quad buffers 834 also controlled by pulse inhibit line 828. Data bus 806 connects Port 5 of micro computer 802 and parallel connected receiver and transmitter buffer registers of UART 804. Reset input to micro computer 802 is furnished on reset line 888 at the output of inverter 890. Input to inverter 890 is controlled by a positive five volts applied through the RC network comprising resistor 892 and capacitor 894.

Talk/no talk line 846 applied to Port 4 of micro computer 802 on talk/no talk input line 850 from inverters 848 informs microcomputer 802 as to whether or not it should communicate with CPU-console 90. Inputs to Port 4 and Port 0 on gallons/liters line 906, maximum time flow line 908 and other inputs which establish whether to blank the first 20,000ths of unit volume or not, inform microcomputer 802 as to these additional parameters imposed by switch block 904.

An additional control input to micro computer 802 on transmitter buffer register empty line 930 from UART 804 indicates that UART 804 is ready for new data. Interrupt to microcomputer 802 from UART 804 is supplied on data received/external interrupt line 922. Control outputs at Port 4 of micro computer 802 on read line 924, write line 926 and master reset line 928 are supplied as inputs to UART 804. Clock oscillator 808 applies a clocking signal on micro computer clock line 810 and a UART clock signal on UART clock line 812 to UART 804. The output frequency of clock oscillator 808 is determined by crystal 809 and the data rate of UART 804 at its transmit and receiver register clocks is 1/16 of the input frequency on UART clock line 812.

UART 804 is configured to match dispenser UART 646 in that a character format is set up of eight data bits, one start and stop bit, with no parity bit. This is accomplished by setting character length select 2 (CLS2) line 914, character length select 1 (CLS1) line 916 and parity inhibit (PI) line 918 to a logic one while setting stop bit select (SBS) line 920 to a logic zero level. Output of UART 804 from its transmitter register output line through inverter 912 is applied to input/output board 754, FIG. 11, on dispenser talk to console line 648'. Serial information to UART 804 from input/output board 754 on console talk to dispenser line 662' is input to the receiver register input of UART 804 through inverter 910.

Price set inhibit lines 880 from Port 1 of microcomputer 802 are input to decoder 878. Output on manual price set enable lines 852 to BCD thumbwheel switches 884 allow a unit price per gallon to be established on data bus 806 through diodes 886 in the event that micro computer 802 is to be operated independent of CPU-console 90. The closing of SPST switch 874 on manual/self serve line 876 input to port one of micro computer 802 establishes a condition allowing micro computer 802 to operate independently of CPU-console 90.

A reset signal from a handle reset 960 of a dispenser 775 input to a remote terminal 800 on reset line 852 passes through a delay circuit 854 for input to Port 1 of microcomputer 802 on reset input line 858. Output of delay circuit 854 is also applied to monitoring output line 856 at Port 1 of microcomputer 802. Transistor 860 through inverter 862 furnishes a control signal on line 864 to the pump motor 952 and slow flow valve 958 of dispenser 775. Likewise, output at port one of micro computer 802 on pivot valve line 866 controls pilot valve 956 on pilot valve output line 872 through transistor 868 and inverter 870. Data and sync outputs from micro computer 802 are furnished at port zero on data line 896 and sync line 898 respectively. These signals are respectively inverted through inverters 897 and 899 for output to display 962 of dispenser 775 on sync output line 902 and data output line 900.

CPU To Microcomputer Protocol

All of the data sent between CPU-console 90 and the terminals 800 is conducted on a three wire, asynchronous, 9600 baud communications link comprising dispenser talk to console line 648, console talk to dispenser line 662 and DC common line 750. Each character of the data has one start and stop bit and eight bits of data. The start bit is followed by eight bits of data which can be either high or low and completed by one stop bit. At 9600 baud each character takes 1.04 milliseconds for the transmission of all ten bits of information.

To greatly reduce the number of interconnecting wires between CPU-console 90 and the remote terminals 800 each of the sixteen micro computers 802 have a unique address. This enables a common pair of wires to be bused to all sixteen remote terminals 800 through two input/output boards 754. The unique address of each microcomputer 802 is established by logic levels on identifier one bit line 836, identifier two bit line 838, identifier four bit line 840 and identifier eight bit line 842. Because this address is unique for each microcomputer 802 (and hence remote terminals 800 and dispensers 775), the CPU-console 90 is able to send commands or requests for data to both input/output boards 754 and only one of the sixteen remote terminals 800 will respond.

Figure 14:
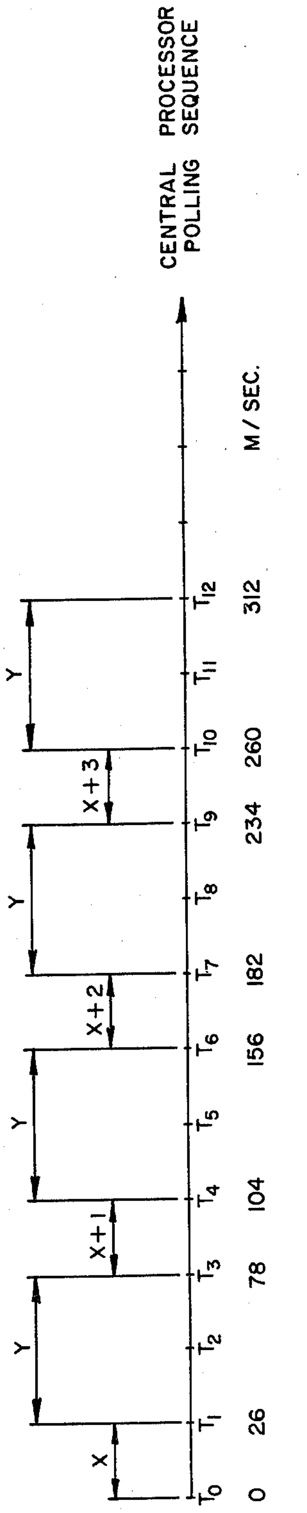
FIG. 14 is a diagram showing the time relationship of the central processor polling sequence useful in explaining the operation thereof.

In order for the CPU 100 to selectively communicate to one micro computer 802 and not the other fifteen micro computers 802, the first character that is sent is the address for that micro computer 802. All of the addresses for the micro computers 802 have a hex F (1111) for the most significant four bits. The least significant four bits contain the address for one of the sixteen possible micro computers 802 in the system (hex 0 through hex F). Referring now to FIG. 14, the CPU-console 90 polling sequence is illustrated. The CPU-console 90 is continually polling all of the sixteen microcomputers 802 one at a time just for their status word. Between each poll represented by X, X+1, X+2, X+3 etc. is a poll Y for the output of a particular dispenser 775 whose information is then currently being displayed on function display 586. This enables the CPU-console 90 to monitor the status of all sixteen dispensers 775 while still maintaining the current money, volume and price per unit volume for the dispenser 775 displayed on function display 586.

At time T0 the first X time frame of 26X(t) milliseconds begins (t is a function of the EPROM board 280 program). During this first time frame, X terminal 800 is polled for its status word. Within two milliseconds X terminal 800 responds to the CPU-console 90 with its status word. At time T1, a 52X(t) millisecond Y time frame begins and CPU-console 90 polls the terminal 800 whose information is being displayed on function display 586. Within two milliseconds after the completion of this poll, the displayed terminal 800 responds with the money, volume, price per unit volume and its status word. At the end of this Y time frame at time T3, CPU-console 90 next polls the X+1 terminal 800 with a status word request. Similarly, within two milliseconds the X+1 terminal 800 responds with its status word. Likewise, at time T4 CPU-console 90 polls the displayed terminal 800 with another request for that terminal's display data. The displayed terminal 800 will respond within two milliseconds with its display data (money, volume, price per unit volume and its status word). This polling technique is maintained with each X, X+1, X+2, X+3 etc. terminal 800 being incremented for each poll. After the increment, the number is checked against the slide switch matrices 484 of strobe board 452. If that particular terminal 800 is not on the matrix formed by slide switch matrices 484, then the number is incremented again until an existing terminal 800 is found. The terminal 800 whose display data is requested during the Y time frames, is not incremented but remains set at that particular terminal 800 being displayed on function display 586.

In order to maintain the integrity of the data being passed between CPU-console 90 and remote terminals 800, a means of error checking is integrated into the system protocol. This error checking is accomplished by "double talk". In this manner, a character is sent in its normal one byte format immediately followed by the same character with the same byte of data inverted. The CPU-console 90 or terminal 800, receiving this "double talk" compares the two characters for a "true"/"complement" relationship. If the second character is the complement of the first, then it is assured that the character received was the character sent. After the address byte is sent, followed by its complement byte, a function character follows followed by its complement byte. This function character tells the microcomputer 802 what if any data follows or whether to respond to the function character. The function character determines whether or not any data follows. Because each microcomputer 802 has a unique address, only one such microcomputer 802 will respond with its status word. The address characters ED and EF are used to address all sixteen micro computers 802 simultaneously. In this manner, software instructions to provide an emergency stop function to all sixteen dispensers 775 may be utilized in addition to electrically disconnecting the dispensers 775 from their power source.

Therefore, a typical poll originating at time T0, T3, T6, T9 etc. has the format of one byte of address information, one byte of complementary address information, one byte of function information, followed by one byte of complementary function information. This scheme allows an eight bit check for each eight bits transmitted. Every character sent between CPU-console 90 and a terminal 800 is sent in the "true"/"complement" format.

In the specific embodiment of the invention shown, the following is a list of possible function characters sent between the CPU-console 90 and an addressed remote terminal 800 generated in response to the information supplied by specific switches on function key board 510 and status key board 622 operated on by microprocessor 100 in response to instructions stored in EPROM board 280.

$A\overline{A}B\overline{B}$

A is the address for the particular dispenser
$\overline{A}$ is the complement of the address.
B is the particular function character.
$\overline{B}$ is the function character's complement.

A0=CPU-console 90 request for an addressed terminal 800 identification number A1=CPU-console 90 request for an addressed terminal 800 display data format of display information back to CPU-console 90 for display at function display 586 of display data from remote terminals 800:

$A\overline{A}B\overline{B}C\overline{C}D\overline{D}E\overline{E}F\overline{F}G\overline{G}H\overline{H}I\overline{I}$ A—PPG Least
B—PPG Most Significant
C—Money Least Significant
D—Money Middle Byte
E—Money Most Significant
F—Volume Least Significant
G—Volume Middle Byte
H—Volume Most Significant
I—Status word A2=is a CPU-console 90 request for an addressed microcomputer status word. Response from remote terminal 800 is A A (A is remote terminal status word).

A3=is a CPU-console 90 command for the addressed terminal 800 to halt a sale that is in progress. Response from remote terminal 800 is as above.

A4=is a CPU-console 90 command for the addressed terminal 800 to resume (run). The dispenser 775 controlled by the addressed terminal 800 will only resume if it was halted. Again the remote terminal 800 response is as above.

A5=This function character tells the addressed terminal 800 that what follows is approval sequence data.

$A\overline{A}B\overline{B}C\overline{C}D\overline{D}E\overline{E}F\overline{F}G\overline{G}H\overline{H}I\overline{I}J\overline{J}K\overline{K}$ A—is the microcomputer 802 address
B—is the function character 'A5'
C—is the slow flow offset
D—is the least significant byte price per unit vol.
E—is the most significant byte price per unit vol.
F—is the least significant byte money preset
G—is the middle byte of money preset
H—is the most significant byte money preset
I—is the least significant byte volume preset
J—is the middle byte of volume preset
K—is the most significant byte volume preset A6—is the function character to load an addressed microcomputer 802 with a set of display data.

$A\overline{A}B\overline{B}C\overline{C}D\overline{D}E\overline{E}F\overline{F}G\overline{G}H\overline{H}I\overline{I}J\overline{J}$ A—is the microcomputer 802 address
B—is the function character 'A6'
C—is the least significant byte price per unit vol.
D—is the most significant byte price per unit vol.
E—is the least significant byte money preload
F—is the middle byte of money preload
G—is the most significant byte money preload
H—is the least significant byte volume preload
I—is the middle byte of volume preload
J—is the most significant byte volume preload This function is used to put the last sale information on the terminal 800 after power has been down or in the morning.

Another time the preload is used is to preload a new price per unit volume on the terminal 800. When a new price per unit volume is loaded, the previous sale data (money and volume) is also loaded.

A7=reset microcomputer 802 software reset. The remote terminal 800 executes the software reset.

The following is a list of the possible responses to a CPU-console 90 request for an addressed remote terminal 800 status word as utilized in the specific embodiment above described based upon inputs to microcomputer 802 as operated on in accordance with instructions stored in its internal ROM.

| | | |
|---|---|---|
| BIT 7 = HANDLE FLAG | 1-UP | 0-DOWN |
| BIT 6 = SLOW FLOW VALVE | 1-OPEN | 0-CLOSED |
| BIT 5 = PILOT VALVE | 1-OPEN | 0-CLOSED |

| | | |
|---|---|---|
| BIT 4 = APPROVE FLAG | 1-APPROVED | 0-NOT APPROVE |
| BIT 3 = HALTED FLAG | 1-HALTED | 0-NOT HALTED |

| | | |
|---|---|---|
| BIT 2 = SLOW FLOW FLAG | 1-SLOW FLOW | 0-NOT IN SLOW FLOW |
| BIT 1 = RUN FLAG | 1-RUN RECEIVED | 0-RUN NOT RECEIVED |
| BIT 0 = MAX. DEL. MET FLAG | 1-MAX.DEL.MET | 0-MAX.DEL.NOT MET |

Upon power up, an addressed terminal 800 controlled dispenser 775 status word will be '2F' this tells the CPU-console 90 that the dispenser 775 has just been powered up and needs some display information (preload). After the preload has been sent and its integrity verified the terminal 800 will send back a status word of '20'. The '20' status word is the idle state of the dispenser 775. Note that the bit pattern of a status word of '20' means that the pilot valve 956 is the only thing active. As this never happens, the '20' has special meaning (idle state). The status word of '20' is idle dispenser 775 with handle reset 960 down. The status word of 'A0' is idle dispenser 775 with handle reset 960 up. Upon CPU-console 90 observing the 'A0' status word, an approval sequence can be sent to the remote terminal 800. The terminal 800 upon accepting the approval sequence will return with a status word of '90'. This signifies the dispenser 775 is approved and its handle reset 960 is up (active position). After the microcomputer 802 has gone through its segment check, and blanks the status word will change to 'F0'. This means that both valves 856 and 958 are open, the pump motor 952 is on, the handle reset 960 is up and the dispenser 775 is approved. If the dispenser 775 happens to be in slow flow then the status word would be 'D4'. This means the handle reset 960 is up, slow flow valve 958 open (pump motor 952 on), pivot valve 956 (large flow valve) closed, terminal 800 is approved. If CPU-console 90 'halts' a dispenser 775 then both valves 956 and 958 close and the halted flag is set. When the terminal 800 is sent a 'run' command, if the terminal 800 was halted then it will send back its status word with the run bit set. In a few milliseconds, the dispenser 775 will leave the halted condition and resume the sale. If the dispenser 775 was in slow flow at the time it was halted then when it is sent the 'run' command it will resume the sale in slow flow.

When the terminal 800 status word changes from sale in progress to a '20', then the CPU-console 90 requests from that terminal 800 display data which will be the data that the CPU-console 90 collects and totalizes with. The terminal 800 is then idle with its status word at '20'. When the terminal 800 status word changes to 'A0' then the sale sequence starts all over again.

An improved data processing system and method is disclosed herein. By the system and method of the invention, the accurate reception of data between the transmitter and a receiver is insured. Both the system and method have application in a fuel dispensing system. The system and method have great flexibility in establishing various fluctuating dispensing parameters. A central console control is provided which can supervise and monitor a plurality of remote terminals while nonetheless allowing the terminals to operate dispensers independently of the console in the event of its failure or desired attendant operation. This system and method also allows the addition of various peripheral equipment thereto without system redesign while ensuring the accurate transmission and reception of data to and from such equipment.

While there have been described above the principles of this invention in connection with specific apparatus, it is to be clearly understood that this description is made only by way of example and not as a limitation to the scope of the invention.

What is claimed is:

1. In a fuel dispenser system, the combination including a plurality of fuel dispensers, each of which is operable independently of the other fuel dispensers, a digital readout means on each dispenser for displaying information relating to dispensed gallonage and the cost thereof, a plurality of remote terminals, one for each fuel dispenser, controlling its operation and its digital readout means, a first power supply means operatively connected to each of said remote terminals, a CPU-console receiving and transmitting digital signals which address and control each of said remote terminals, a second power supply means for enabling said CPU-console, each remote terminal being operative in response to digital signals from its fuel dispenser as well as from said CPU-console, wherein the improvement comprises:

said plurality of remote terminals being located adjacent said CPU-console and remote from said fuel dispensers whereby replacement of said CPU-console and each of said remote terminals may be accomplished without dismantling any of the fuel dispensers, and each remote terminal having a microcomputer capable of independent processing of dispensed gallonage and cost information of its respective dispenser whereby each remote terminal may operate even when the CPU-console is inoperative.

2. The invention as recited in claim 1 wherein each of said remote terminals has unit gallonage price setting switches.

3. The invention as recited in claim 2 wherein the price setting switches are operable only when the CPU-console is inoperative.

4. The invention as recited in claim 3 wherein the digital readout means comprises liquid crystal displays.

5. The invention as recited in claim 4 wherein said CPU-console has a separate address code corresponding to each of said remote terminals for the selective control of each said remote terminals.

* * * * *